US008023003B2

(12) United States Patent
Paik et al.

(10) Patent No.: US 8,023,003 B2
(45) Date of Patent: Sep. 20, 2011

(54) APPARATUS AND METHOD FOR GENERATING PANORAMA IMAGES AND APPARATUS AND METHOD FOR OBJECT-TRACKING USING THE SAME

(75) Inventors: Joon-Ki Paik, Seoul (KR); Kyoung-Ju Park, Seoul (KR); In-Ho Paek, Seoul (KR)

(73) Assignee: Chung-Ang University Academy Cooperation Foundation, Seoul (KR)

( * ) Notice: Subject to any disclaimer, the term of this patent is extended or adjusted under 35 U.S.C. 154(b) by 380 days.

(21) Appl. No.: 12/402,605

(22) Filed: Mar. 12, 2009

(65) Prior Publication Data

US 2009/0231447 A1    Sep. 17, 2009

(30) Foreign Application Priority Data

Mar. 12, 2008    (KR) .................... 10-2008-00022873

(51) Int. Cl.
*H04N 5/228* (2006.01)
*H04N 7/00* (2011.01)
*G06K 9/32* (2006.01)
(52) U.S. Cl. .................... 348/222.1; 348/36; 348/208.4; 382/294
(58) Field of Classification Search ............... 348/222.1, 348/36, 208.4; 382/294
See application file for complete search history.

(56) References Cited

U.S. PATENT DOCUMENTS

| 6,097,854 | A | * | 8/2000 | Szeliski et al. | 382/284 |
| 7,092,555 | B2 | * | 8/2006 | Lee et al. | 382/118 |
| 7,778,485 | B2 | * | 8/2010 | Zeineh et al. | 382/284 |
| 2005/0286753 | A1 | * | 12/2005 | Ho | 382/141 |
| 2007/0297696 | A1 | * | 12/2007 | Hamza et al. | 382/294 |
| 2009/0046951 | A1 | * | 2/2009 | Paragios et al. | 382/294 |
| 2009/0092336 | A1 | * | 4/2009 | Tsurumi | 382/294 |
| 2009/0136102 | A1 | * | 5/2009 | Kimpe et al. | 382/128 |
| 2010/0014780 | A1 | * | 1/2010 | Kalayeh | 382/284 |
| 2010/0092037 | A1 | * | 4/2010 | Peleg et al. | 382/103 |
| 2010/0209008 | A1 | * | 8/2010 | Chertok et al. | 382/224 |
| 2010/0283853 | A1 | * | 11/2010 | Acree | 348/144 |

* cited by examiner

*Primary Examiner* — Lin Ye
*Assistant Examiner* — Chia-Wei A Chen
(74) *Attorney, Agent, or Firm* — Occhiuti Rohlicek & Tsao LLP

(57) ABSTRACT

Provided are an apparatus and method for generating panorama images and an apparatus and method for tracking an object using the same. The apparatus for generating panorama images estimates regional motion vectors with respect to respective lower regions set in an image frame, determines a frame motion vector by using the regional motion vectors based on a codebook storing sets of normalized regional motion vectors corresponding to a camera's motion and then accumulates motion mediating variables computed with respect to respective continuous image frames to determine an overlapping region, and matches the overlapping regions to generate a panorama image.

9 Claims, 23 Drawing Sheets

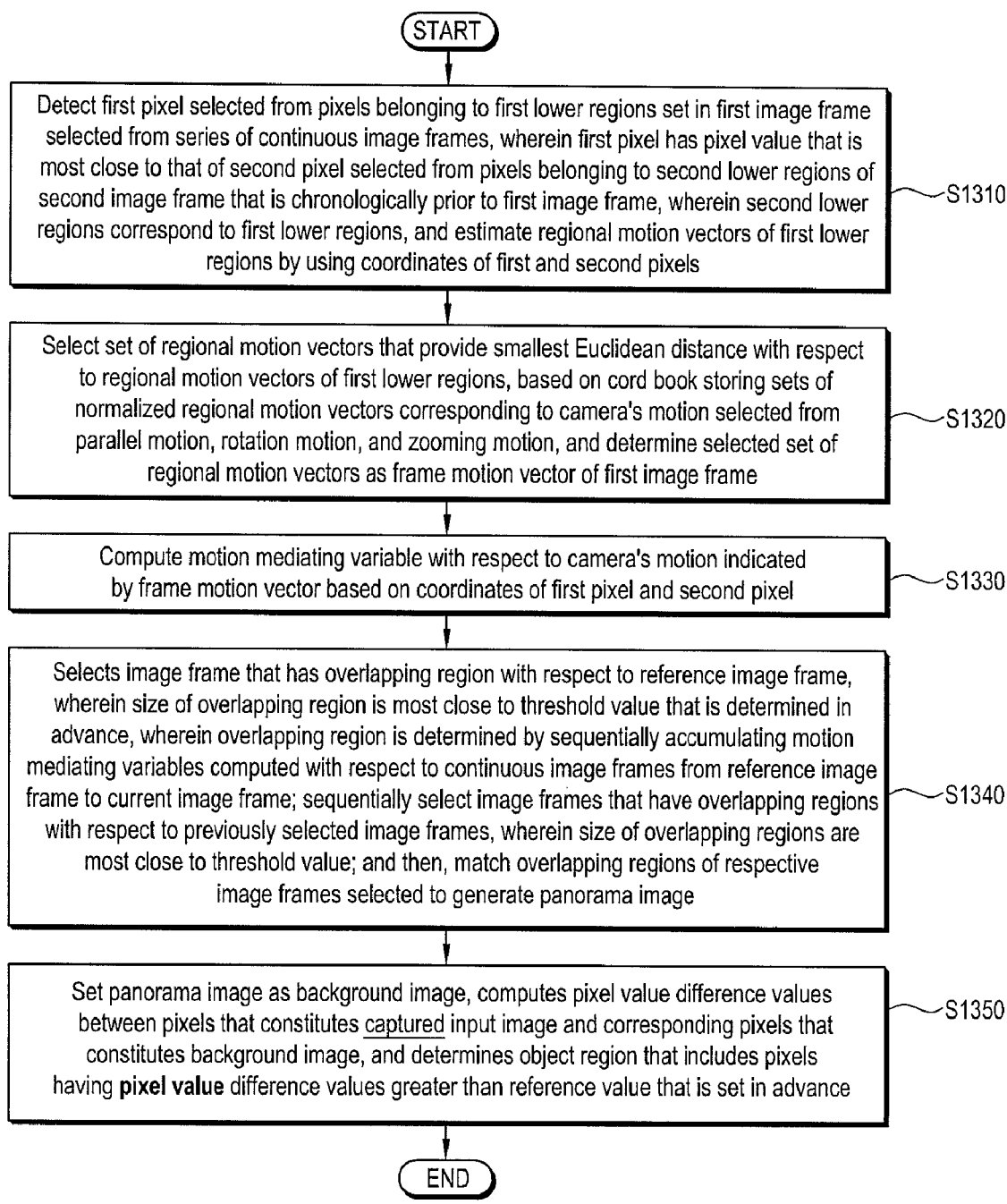

ium is accurately extracted, noises may occurs due
APPARATUS AND METHOD FOR GENERATING PANORAMA IMAGES AND APPARATUS AND METHOD FOR OBJECT-TRACKING USING THE SAME

CROSS-REFERENCE TO RELATED PATENT APPLICATION

This application claims the benefit of Korean Patent Application No. 10-2008-0022873, filed on Mar. 12, 2008, in the Korean Intellectual Property Office, the disclosure of which is incorporated herein in its entirety by reference.

BACKGROUND OF THE INVENTION

1. Field of the Invention

The present invention relates to an apparatus and method for generating panorama images and an apparatus and method for tracking an object using the same, and more particularly, to an apparatus and method for generating a single image by combining a plurality of image frames and an apparatus and method for detecting an object in a captured image to track the object.

2. Description of the Related Art

Recently, as a market for digital cameras is expanding, a variety of applications using digital techniques are more highlighted. For example, there is a technique for forming a panorama image, in which a geometrical relationship between a camera and a background that is photographed by the camera is used to spatially expand an image.

According to a conventional technique, images are aligned by extracting and matching feature points of respective images. In this case, however, errors may be increased because feature points of respective images are overall non-uniform and feature points can be wrongly extracted. To solve these problems, a plurality of block regions are set in an image, and a regional motion vector of each block is estimated by phase-matching in a frequency region. By using an equalization method using the estimated regional motion vector, a frame motion vector indicating a motion amount or direction of a frame is determined. If the regional motion vector is regular and has a predictable pattern, errors do not occur when a frame motion vector is determined and thus, images can be accurately matched. In fact, however, the estimated regional motion vector is not always regular, errors occur when the frame motion vector is determined and images are thus wrongly matched and panorama images have a low quality. In addition, since complex computing, such as transformation of images into a frequency region and Fourier transformation to extract a phase component, is required, a process speed is low.

In addition, as security on public places and personal regions is more concerned, monitoring cameras are commonly installed. Furthermore, techniques for automating intelligence functions, such as an object tracking function and an object identification function, are demanded. Specifically, a demand for an all-direction monitoring technique that enables object-tracking with a wide field of view is increasing.

A conventional video object tracking system using a single fixed camera, in most cases, uses a camera having a limited field of view (FOV). Accordingly, when the entire or part of an object that is tracked is outside a corresponding FOV, tracking stops. To solve this problem, wide FOV-based studies are being conducted to monitor a wider region. For example, a system using a pan-tilt-zoom (PTZ) camera is suggested.

According to this system, a plurality of images that are obtained in advance are aligned to form a background image and then, an object and a background are separated by using a difference between a captured image and the background image. However, when the PTZ camera is used, the object and the background moves together, and thus, unless the background image is accurately extracted, noises may occurs due to mismatching when the difference of images are computed and, in turn, tracking the object is difficult.

SUMMARY OF THE INVENTION

The present invention provides an apparatus and method for generating panorama images, in which a regional motion vector of a block region set in an image is easily computed and effects of a wrongly estimated regional motion vector are minimized.

The present invention also provides a computer readable recording medium in which a program for executing the method of generating panorama images in computer is recorded, wherein, in the method, a regional motion vector of a block region set in an image is easily computed and effects of a wrongly estimated regional motion vector are minimized.

The present invention also provides an apparatus and method for accurately tracking an object, wherein a background image that is used to track the object is accurately generated and noises generated when a difference between a captured image and the background image is computed are reduced.

The present invention also provides, a computer readable recording medium in which a program for executing a method of accurately tracking an object in computer is recorded, wherein, in the method, a background image that is used to track the object is accurately generated and noises generated when a difference between a captured image and the background image is computed are reduced. According to an aspect of the present invention, there is provided an apparatus for generating a panorama image, the apparatus including: a regional motion vector estimation unit that detects a first pixel selected from pixels belonging to first lower regions set in a first image frame selected from a series of continuous image frames, wherein the first pixel has a pixel value that is most close to that of a second pixel selected from pixels belonging to second lower regions of a second image frame that is chronologically prior to the first image frame, wherein the second lower regions correspond to the first lower regions, and estimates regional motion vectors of the first lower regions by using coordinates of the first and second pixels; a frame motion vector determination unit that selects a set of regional motion vectors that provide the smallest Euclidean distance with respect to the regional motion vectors of the first lower regions, based on a codebook storing sets of normalized regional motion vectors corresponding to a camera's motion selected from a parallel motion, a rotation motion, and a zooming motion, and determines the selected set of regional motion vectors as a frame motion vector of the first image frame; a motion mediating variable computing unit that computes a motion mediating variable with respect to the camera's motion indicated by the frame motion vector based on the coordinates of the first pixel and second pixel; a frame selection unit that selects an image frame having an overlapping region with respect to a reference image frame, wherein the size of the overlapping region is most close to a threshold value that is determined in advance, wherein the overlapping region is determined by sequentially accumulating motion mediating variables computed with respect to continuous image frames from the reference image frame to the current image frame, and then sequentially selects image frames that have overlapping regions with respect to the previously selected image frames, wherein the size of the overlapping regions are most close to the threshold value; and a frame combination unit that sequentially matches overlapping regions of image frames selected by the frame selection unit to the reference image frame to generate a panorama image.

According to another aspect of the present invention, there is provided a method of generating a panorama image, the method including: estimating regional motion vectors by detecting a first pixel selected from pixels belonging to first lower regions set in a first image frame selected from a series of continuous image frames, wherein the first pixel has a pixel value that is most close to that of a second pixel selected from pixels belonging to second lower regions of a second image frame that is chronologically prior to the first image frame, wherein the second lower regions correspond to the first lower regions, and estimating regional motion vectors of the first lower regions by using coordinates of the first and second pixels; determining a frame motion vector by selecting a set of regional motion vectors that provide the smallest Euclidean distance with respect to the regional motion vectors of the first lower regions, based on a codebook storing sets of normalized regional motion vectors corresponding to a camera's motion selected from a parallel motion, a rotation motion, and a zooming motion, and determining the selected set of regional motion vectors as a frame motion vector of the first image frame; computing a motion mediating variable with respect to the camera's motion indicated by the frame motion vector based on coordinates of the first pixel and second pixel; selecting frames by selecting an image frame having an overlapping region with respect to a reference image frame, wherein the size of the overlapping region is most close to a threshold value that is determined in advance, wherein the overlapping region is determined by sequentially accumulating motion mediating variables computed with respect to continuous image frames from the reference image frame to the current image frame, and then sequentially selecting image frames having overlapping regions with respect to the previously selected image frames, wherein the size of the overlapping regions are most close to the threshold value; and combining frames by sequentially matching overlapping regions of image frames selected by the frame selection unit to the reference image frame to generate a panorama image.

According to another aspect of the present invention, there is provided an apparatus for tracking an object, the apparatus including: a regional motion vector estimation unit that detects a first pixel selected from pixels belonging to first lower regions set in a first image frame selected from a series of continuous image frames, wherein the first pixel has a pixel value that is most close to that of a second pixel selected from pixels belonging to second lower regions of a second image frame that is chronologically prior to the first image frame, wherein the second lower regions correspond to the first lower regions, and estimates regional motion vectors of the first lower regions by using coordinates of the first and second pixels; a frame motion vector determination unit that selects a set of regional motion vectors that provide the smallest Euclidean distance with respect to the regional motion vectors of the first lower regions, based on a codebook storing sets of normalized regional motion vectors corresponding to a camera's motion selected from a parallel motion, a rotation motion, and a zooming motion, and determines the selected set of regional motion vectors as a frame motion vector of the first image frame; a motion mediating variable computing unit that computes a motion mediating variable with respect to the camera's motion indicated by the frame motion vector based on coordinates of the first pixel and second pixel; a panorama image generation unit that selects an image frame that has an overlapping region with respect to a reference image frame, wherein the size of the overlapping region is most close to a threshold value that is determined in advance, wherein the overlapping region is determined by sequentially accumulating motion mediating variables computed with respect to continuous image frames from the reference image frame to the current image frame, sequentially selects image frames that have overlapping regions with respect to the previously selected image frames, wherein the size of the overlapping regions are most close to the threshold value, and matches overlapping regions of respective image frames selected to generate a panorama image; and an object extraction unit that sets the panorama image as a background image, computes pixel value difference values between pixels that constitutes a captured input image and corresponding pixels that constitutes the background image, and determines an object region that includes pixels having pixel value difference values greater than a reference value that is set in advance.

According to another aspect of the present invention, there is provided a method of tracking an object, the method including: estimating regional motion vectors by detecting a first pixel selected from pixels belonging to first lower regions set in a first image frame selected from a series of continuous image frames, wherein the first pixel has a pixel value that is most close to that of a second pixel selected from pixels belonging to second lower regions of a second image frame that is chronologically prior to the first image frame, wherein the second lower regions correspond to the first lower regions, and estimating regional motion vectors of the first lower regions by using coordinates of the first and second pixels; determining a frame motion vector by selecting a set of regional motion vectors that provide the smallest Euclidean distance with respect to the regional motion vectors of the first lower regions, based on a codebook storing sets of normalized regional motion vectors corresponding to a camera's motion selected from a parallel motion, a rotation motion, and a zooming motion, and determining the selected set of regional motion vectors as a frame motion vector of the first image frame; computing a motion mediating variable with respect to the camera's motion indicated by the frame motion vector based on coordinates of the first pixel and second pixel; generating a panorama image by selecting an image frame that has an overlapping region with respect to a reference image frame, wherein the size of the overlapping region is most close to a threshold value that is determined in advance, wherein the overlapping region is determined by sequentially accumulating motion mediating variables computed with respect to continuous image frames from the reference image frame to the current image frame; sequentially selecting image frames that have overlapping regions with respect to the previously selected image frames, wherein the size of the overlapping regions are most close to the threshold value; and then, matches overlapping regions of respective image frames selected; and tracking an object by setting the panorama image as a background image, computing pixel value difference values between pixels that constitutes a captured input image and corresponding pixels that constitutes the background image, and determining an object region that includes pixels of which pixel value difference values are greater than a reference value that is set in advance.

BRIEF DESCRIPTION OF THE DRAWINGS

The above and other features and advantages of the present invention will become more apparent by describing in detail exemplary embodiments thereof with reference to the attached drawings in which:

FIG. 13 is a flowchart illustrating a method of tracking an object according to an embodiment of the present invention.

DETAILED DESCRIPTION OF THE INVENTION

Figure 1:
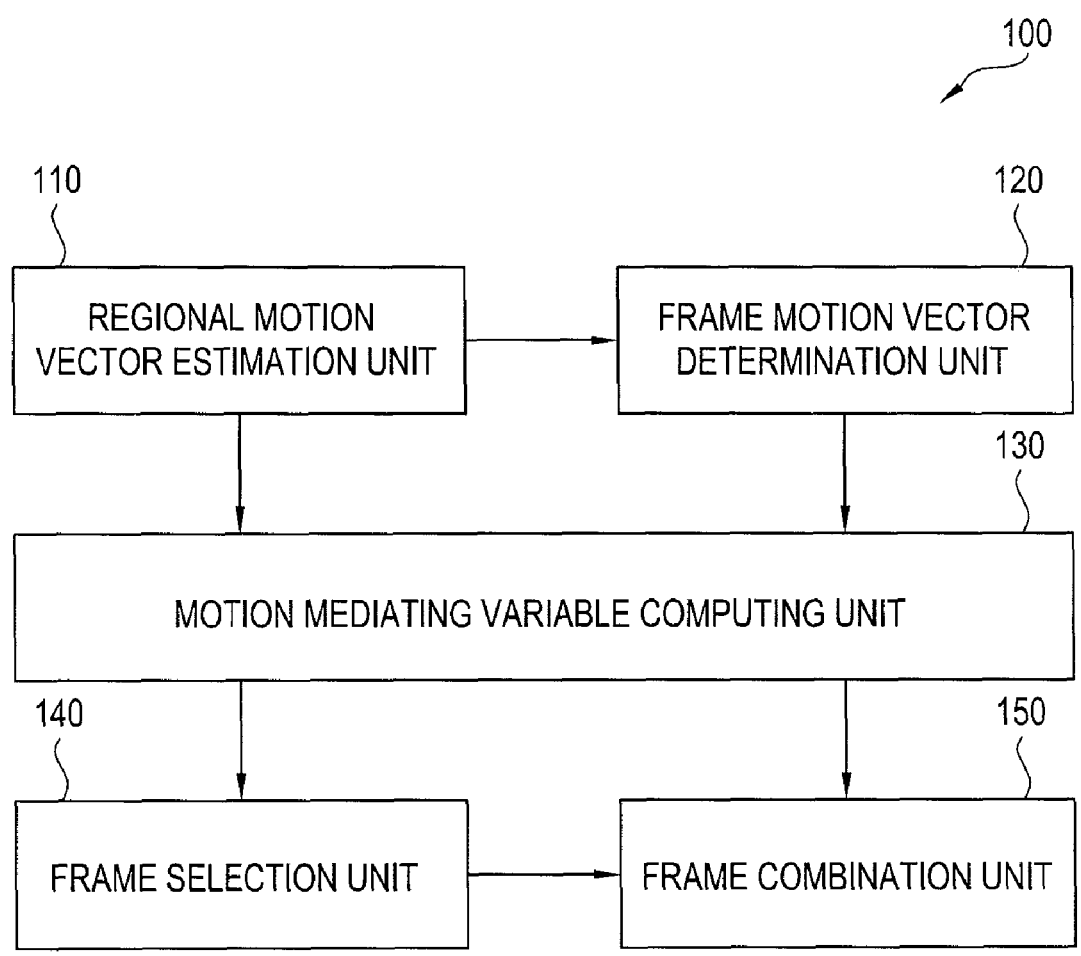
FIG. 1 is a block diagram illustrating a panorama image generation apparatus according to an embodiment of the present invention.

Hereinafter, an apparatus and method for recovering automatic focusing according to embodiments of the present invention will now be described in detail by referring to the attached drawings. In the drawings, like reference numerals denote like members FIG. 1 is a block diagram illustrating a panorama image generation apparatus 100 according to an embodiment of the present invention.

Referring to FIG. 1, the panorama image generation apparatus 100 according to the current embodiment includes a regional motion vector estimation unit 110, a frame motion vector determination unit 120, a motion mediating variable computing unit 130, a frame selection unit 140, and a frame combination unit 150.

The regional motion vector estimation unit 110 detects a first pixel selected from pixels belonging to first lower regions set in a first image frame selected from a series of continuous image frames, wherein the first pixel has a pixel value that is most close to that of a second pixel selected from pixels belonging to second lower regions of a second image frame that is chronologically prior to the first image frame, wherein the second lower regions correspond to the first lower regions, and then estimates regional motion vectors of the first lower regions by using coordinates of the first and second pixels.

Figure 2:
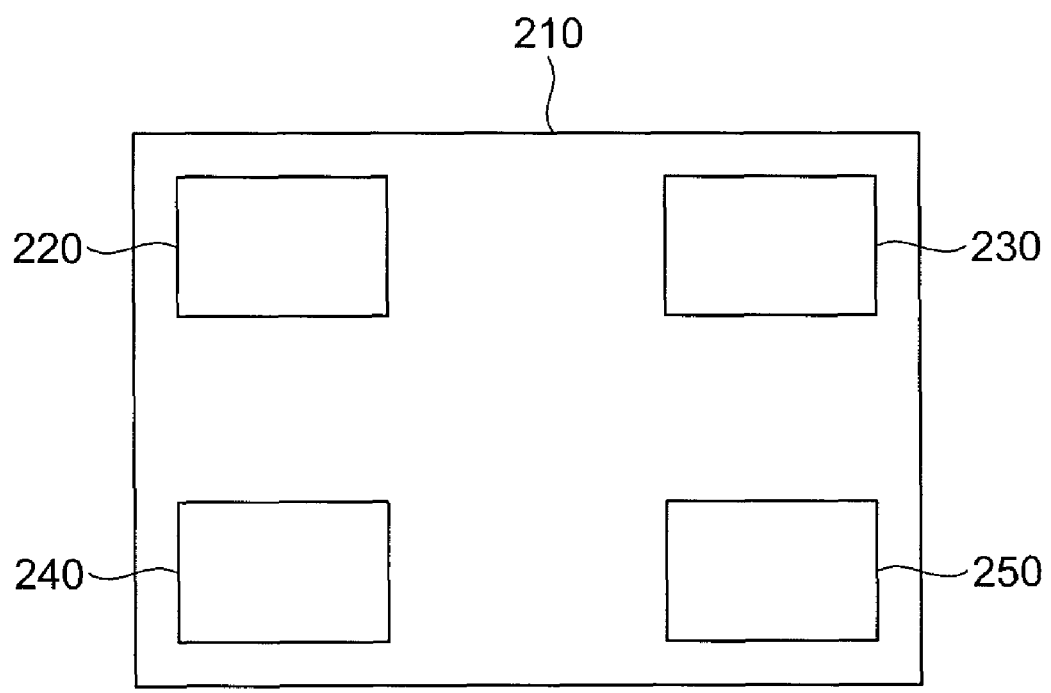
FIG. 2 illustrates first lower regions of a first image frame, set by a regional motion vector estimation unit.

FIG. 2 illustrates the first lower regions of the first image frame set by the regional motion vector estimation unit 110. For a pixels located at the center of an image frame, coordinates thereof may not change according to the rotation or zooming of a camera, and, in general, four corner regions include motion information of the image frame. Accordingly, the first lower regions 220, 230, 240, and 250 may set in the first image frame 210 respectively apart from four corners by a predetermined distance. In addition, to compute a degree of pixel coordinate shift, the second lower regions may be set in portions of the second image frame corresponding to the first lower regions 220, 230, 240, and 250.

Then, the regional motion vector estimation unit 110 detects a first pixel from in the first lower regions 220, 230, 240, and 250, wherein the first pixel has a pixel value that is most close to that of a second pixel selected from in second lower regions. The second pixel may be any pixel selected from in the second lower regions. For example, the second pixel may be a pixel disposed at the center of the second lower regions, so as to accurately estimate a regional motion vector even when coordinates of a pixel are changed in any direction.

Figure 3:
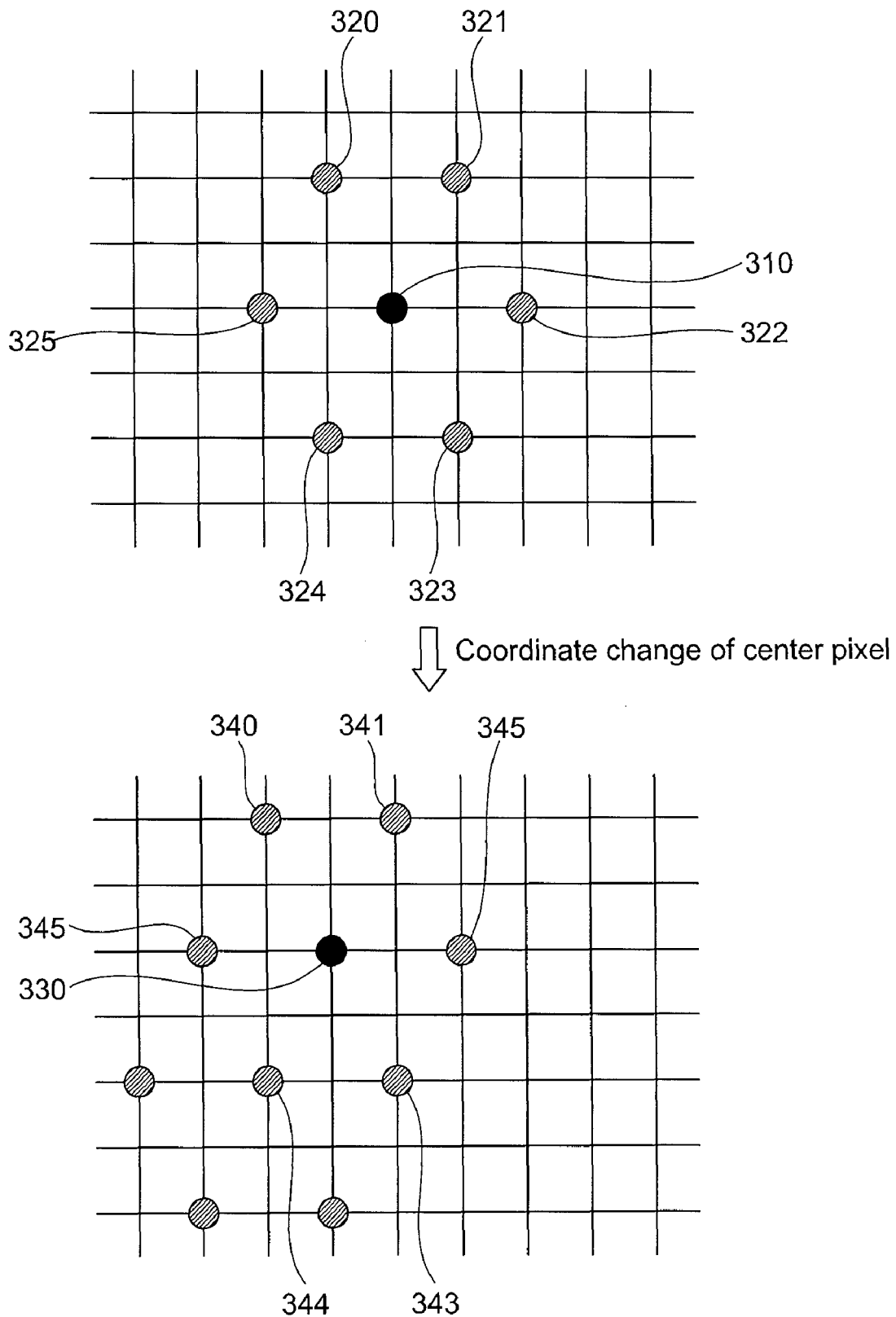
FIG. 3 illustrates a process of detecting a first pixel in the first lower regions.

FIG. 3 illustrates a process of detecting the first pixel in the first lower regions. A pixel having the same coordinate as the second pixel is determined as a center pixel 310, and surrounding pixels 320, 321, 322, 323, 324, and 325 having different coordinates which surrounds the center pixel 310 are selected. Among the center pixel 310 and the surrounding pixels 320, 321, 322, 323, 324, and 325, if the difference between the pixel value of the center pixel 310 and the pixel value of the second pixel is the smallest, the center pixel 310 is determined as the first pixel and the detection process is finished. If the difference between a pixel value of any one 321 of the surrounding pixels 320, 321, 322, 323, 324, and 325 and the pixel value of the second pixel is the smallest, the surrounding pixel 321 is newly determined as a center pixel 330. Then, the difference between the pixel value of the center pixel 330 and the pixel value of the second pixel, and the difference between a pixel value of each of surrounding pixels 340, 341, 342, 343, 344, and 345 that are newly selected as surrounding pixels of the center pixel 330 and the pixel value of the second pixel are computed. This process is repeatedly performed until the difference between a pixel value of a center pixel and the pixel value of the second pixel is the smallest. In this case, the center pixel and the surrounding pixels are selected from pixels belonging to the first lower regions.

When the first pixel is detected in the first lower regions, the regional motion vector estimation unit 110 estimates a regional motion vector that has a coordinate of the second pixel as a starting point and a coordinate of the first pixel as an end point. The number of regional motion vectors estimated in the first image frame may be equal to the number of the first lower regions. The regional motion vectors estimated in the first image frame respectively indicates motion directions and motion amounts of the first lower regions with respect to the second lower regions.

The frame motion vector determination unit 120 selects a set of regional motion vectors that provide the smallest Euclidean distance with respect to the regional motion vectors of the first lower regions, based on a codebook storing sets of normalized regional motion vectors corresponding to a camera's motion selected from a parallel motion, a rotation motion, and a zooming motion, and determines the selected set of regional motion vectors as a frame motion vector of the first image frame.

The frame motion vector indicates the motion of the first image frame with respect to the second image frame, and is represented as a set of regional motion vectors with respect to respective first lower regions. The frame motion vector may be determined by, for example, averaging regional motion vectors. In general, errors may occur when regional motion vectors are estimated and thus, accuracy of the frame motion vector may be degraded. Since the motion between two image frames corresponds to the motion of a camera, the frame motion vector may be accurately determined in such a way that a set of regional motion vectors corresponding to the motion of the camera are stored in advance and then, a set of regional motion vectors that are most close to the estimated regional motion vectors are selected.

Figure 4:
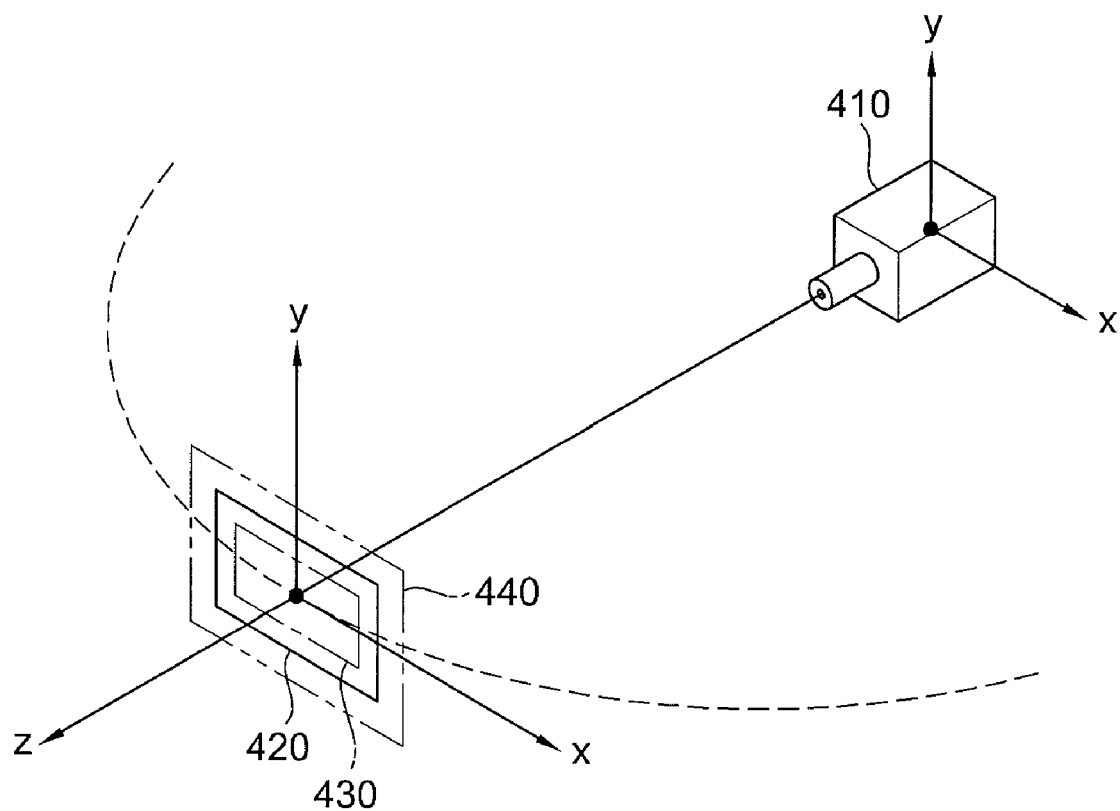
FIG. 4 is a view illustrating an image frame in a two-dimensional plane that is perpendicular to a photographing direction of a camera.

The motion of the camera may be classified into a parallel motion, a rotation motion, and a zooming motion. The motion of an image frame caused by the motion of the camera may be represented as a coordinate shift of a pixel that belongs to the image frame in a two-dimensional plane. FIG. 4 is a view illustrating an image frame 420 in a two-dimensional plane that is perpendicular to a photographing direction of a camera 410. Referring to FIG. 4, the image frame 420 is disposed in a xy plane formed by an x axis and a y axis, and a z axis represents the photographing direction of the camera 410.

For the parallel motion, the camera 410 moves in the direction of the x axis or the y axis and coordinates of pixels belonging to the image frame 420 simultaneously moves in a vertical direction or horizontal direction according to the motion of the camera 410 in the xy plane. If the camera 410 rotates to the x axis and a focusing distance of the camera 410 is sufficiently long, coordinates of pixels belonging to the image frame 420 simultaneously moves in the vertical direction according to the rotation of the camera 410 in the xy plane. In addition, if the camera 410 rotates to the y axis, coordinates of pixels of the image frame 420 simultaneously moves in the horizontal direction in the xy plane. Accordingly, the rotation of the camera 410 with respect to the x axis or y axis is interpreted as a parallel motion of the camera 410 moving in the direction of the y axis or x axis.

When the camera 410 rotates to the z axis, coordinates of pixels of the image frame 420 moves in the xy plane at the same angle with respect to a line passing through the center of the image frame 420. In addition, for the zooming motion, the camera 410 moves in the direction of the z axis, and a distance from a pixel belonging to the image frame 420 to the center of the image frame 420 is reduced or increased by the same ratio, and thus, a reduced image 430 or an enlarged image 440 are generated.

Figure 5A:
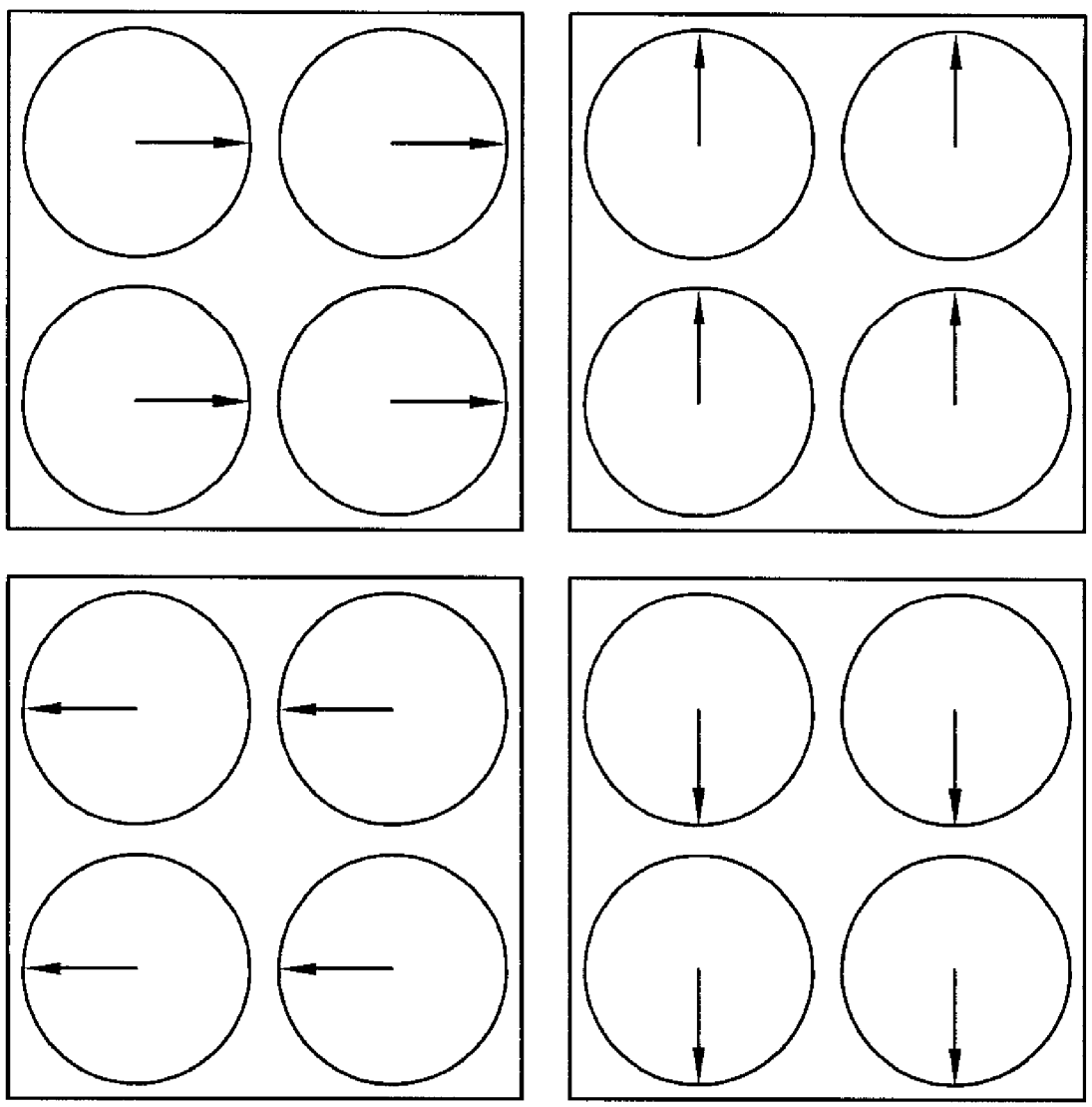
FIGS. 5A through 5C are views illustrating sets of normalized regional motion vectors respectively corresponding to a parallel motion, rotation motion, and zooming motion of a camera.
Figure 5B:
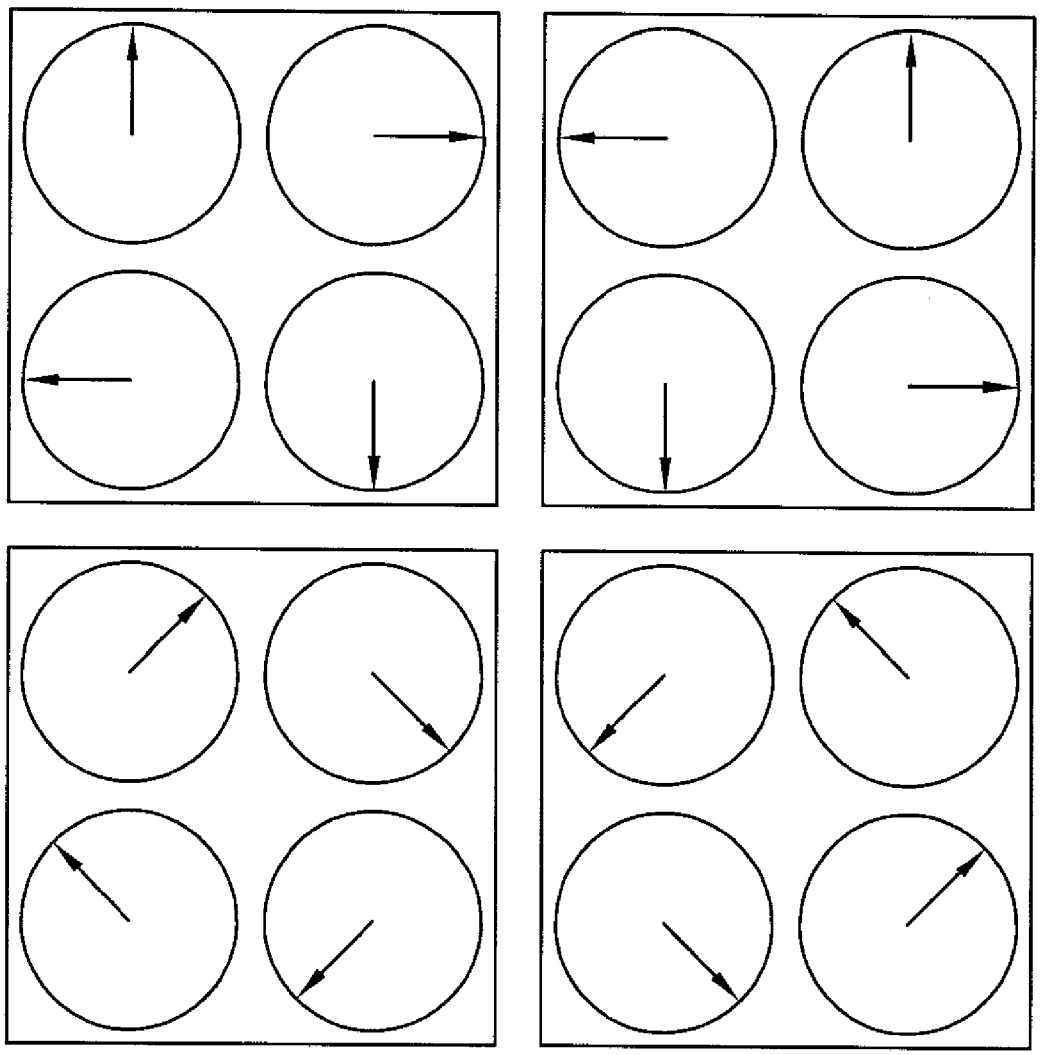
Figure 5C:
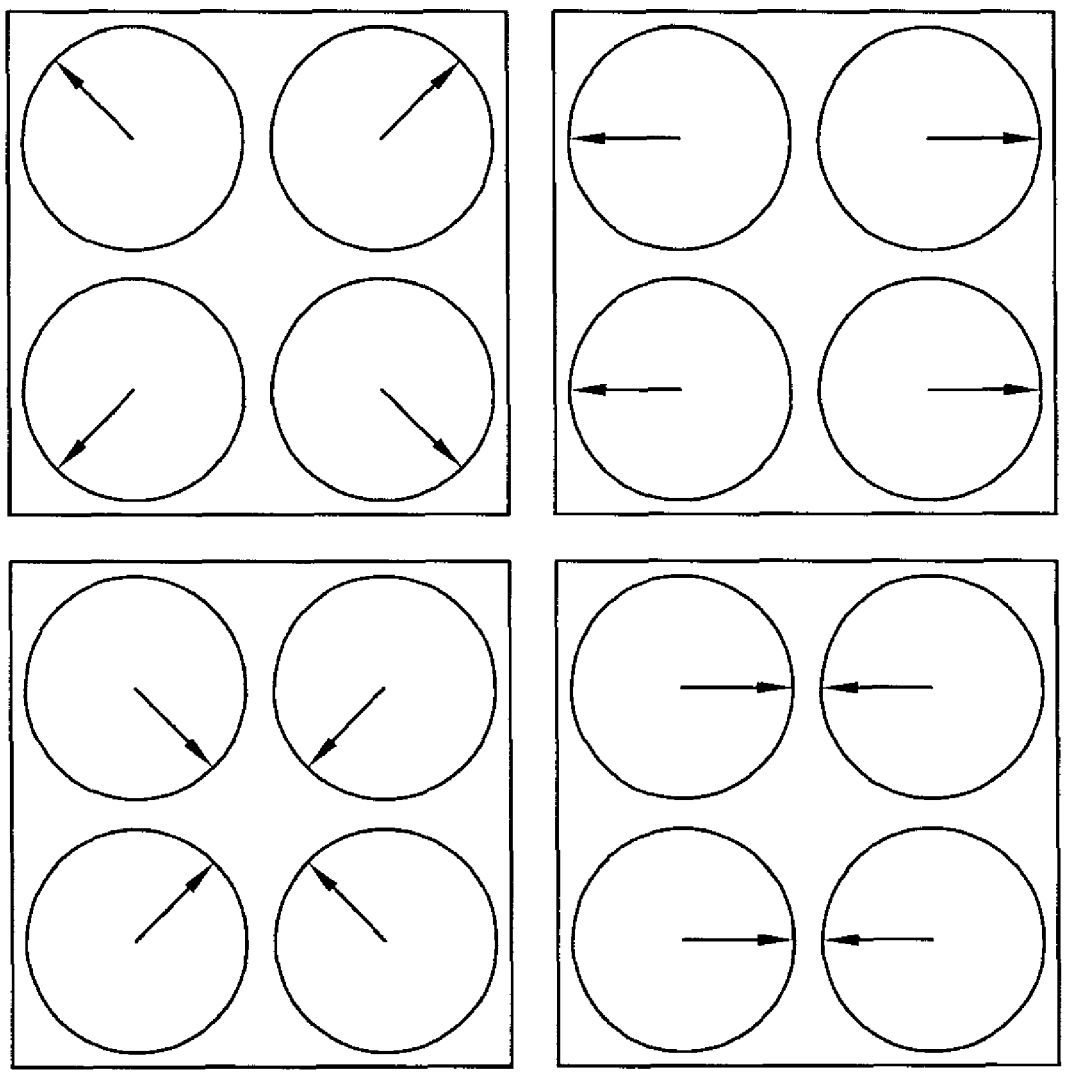

FIGS. 5A through 5C are views illustrating sets of normalized regional motion vectors respectively corresponding to the parallel motion, rotation motion, and zooming motion of a camera. Since coordinate shift of pixels corresponding to the motions of the camera described above are equally applied to respective lower regions set in the image frame, coordinate shift directions of pixels in respective lower regions obtained when the camera moves can be represented as a set, and normalized and stored. For the parallel motion, all the regional motion vectors with respect to the lower regions have the same direction. For the rotation motion, two neighboring regional motion vectors have directions perpendicular to each other. The zooming motion can be a zoom-in motion and a zoom-out motion. For the zoom-in motion, directions of all the regional motion vectors moves away from a center or line passing through the center of the image frame, and for the zoom-out motion, directions of all the regional motion vectors moves toward the center or line passing through the center of the image frame.

The frame motion vector determination unit 120 computes an Euclidean distance between the regional motion vectors of the first lower regions estimated by the regional motion vector estimation unit 110 and the regional motion vectors stored in the codebook through the following Equation, and selects a set of regional motion vectors that provide the smallest Euclidean distance based on the codebook and determines the selected set of regional motion vectors as a frame motion vector of the first image frame:

$$\min_{v^j} d(v, v^j) = \sum_{i=1}^{n} (v_i - v_i^j)^2, \text{ for } j = 1, \ldots, K \quad \text{[Equation 1]}$$

where v is a regional motion vector with respect to the first lower region, $v^j$ is a regional motion vector stored in the codebook, $d(v,v^j)$ is an Euclidean distance between v and $v^j$, n is the number of first lower regions set in the first image frame, and K is the number of regional motion vectors stored in the codebook.

Figure 6A:
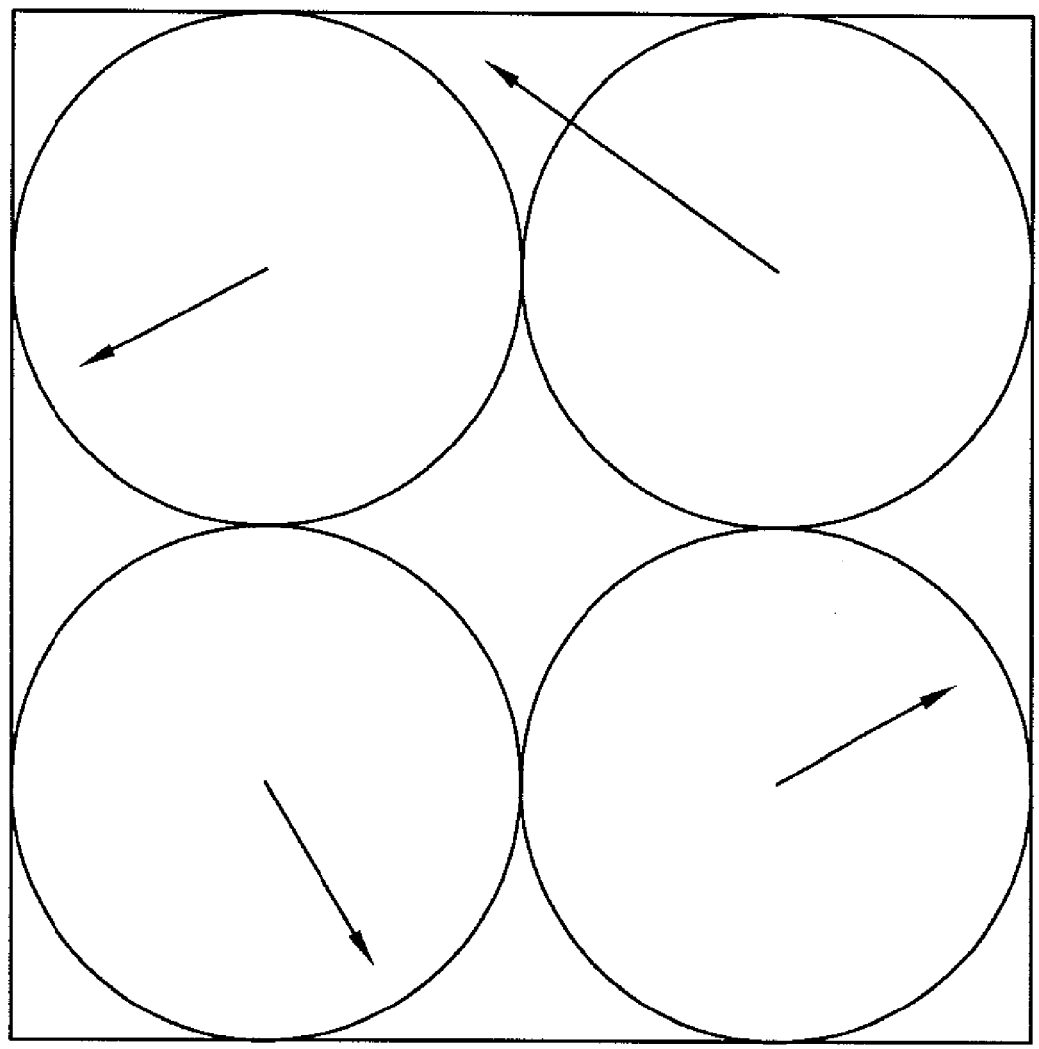
FIGS. 6A and 6B illustrate regional motion vectors with respect to respective first lower regions estimated by a regional motion vector estimation unit and a frame motion vector of a first image frame determined by a frame motion vector determination unit based on a codebook, respectively.
Figure 6B:
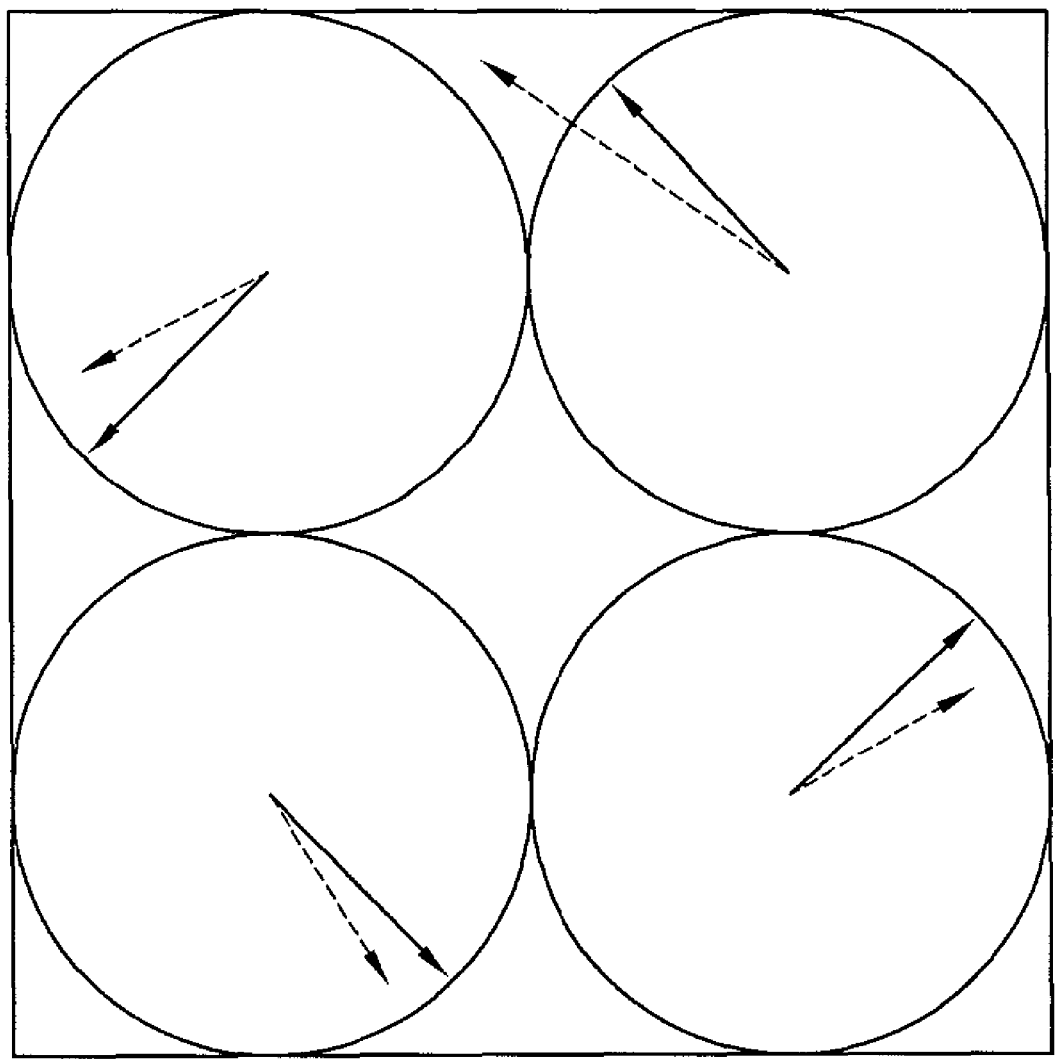

The frame motion vector of the first image frame determined by the frame motion vector determination unit 120 indicates a motion type of the first image frame with respect to the second image frame. If it is assumed that only one type of motion selected from a parallel motion, a rotation motion, and a zooming motion occurs between the second image frame and the first image frame, the motion of the first image frame is determined to be only one motion selected from the parallel motion, the rotation motion, and the zooming motion, according to directions of respective regional motion vectors that constitute the frame motion vector. FIGS. 6A and 6B illustrate regional motion vectors with respect to respective first lower regions estimated by the regional motion vector estimation unit 110 and the frame motion vector of the first image frame determined by the frame motion vector determination unit 120 based on the codebook, respectively.

The motion mediating variable computing unit 130 computes a motion mediating variable with respect to the camera's motion indicated by the frame motion vector based on coordinates of the first pixel and second pixel.

The motion mediating variable is a numerical indicator of the motion of the image frame, such as the parallel motion, the rotation motion, and the zooming motion. The motion of the first image frame with respect to the second image frame is represented by the following Equation:

$$r_1 = r_2 + LMV_1 = sc \begin{bmatrix} \cos\theta & -\sin\theta \\ \sin\theta & \cos\theta \end{bmatrix} r_2 + \begin{bmatrix} t_x \\ t_y \end{bmatrix} \quad \text{[Equation 2]}$$

where $r_1$ is a coordinate of the first pixel, $r_2$ is a coordinate of the second pixel, $LMV_1$ is a regional motion vector with respect to the first lower region, sc is a motion mediating variable with respect to the zooming motion, θ is a rotation angle that is represented as a motion mediating variable with respect to rotation, and $t_x$ and $t_y$ are motion mediating variables with respect to parallel motions in the direction of the x axis and the y axis, respectively.

Since it is assumed that only one type of motion selected from the parallel motion, the rotation motion, and the zooming motion occurs between the second image frame and the first image frame, only one motion mediating variable with respect to one image frame is computed among motion mediating variables corresponding to the parallel motion, the rotation motion, and the zooming motion. However, exceptionally, when a camera has both the parallel motion and a rotation motion to the z axis and two types of motions occurs at the same time, a motion mediating variable corresponding to the parallel motion is computed together with a motion mediating variable corresponding to the rotation motion.

The frame selection unit 140 selects an image frame that has an overlapping region with respect to a reference image frame, wherein the size of the overlapping region is most close to a threshold value that is determined in advance, wherein the overlapping region is determined by sequentially accumulating motion mediating variables computed with respect to continuous image frames from the reference image frame to the current image frame, and then sequentially select image frames that have overlapping regions with respect to the previously selected image frames, wherein the size of the overlapping regions are most close to the threshold value.

The reference image frame is chronologically the first frame selected from a series of continuous image frames to generate a panorama image. The level of motion of respective image frames with respect to the reference image frame may be determined by sequentially accumulating motion mediating variables of respective image frames with respect to the reference image frame. When the motion mediating variables are accumulated, motion mediating variables corresponding to the parallel motion and the rotation motion are added up together, and motion mediating variables corresponding to the zooming motion are multiplied together.

Figure 7A:
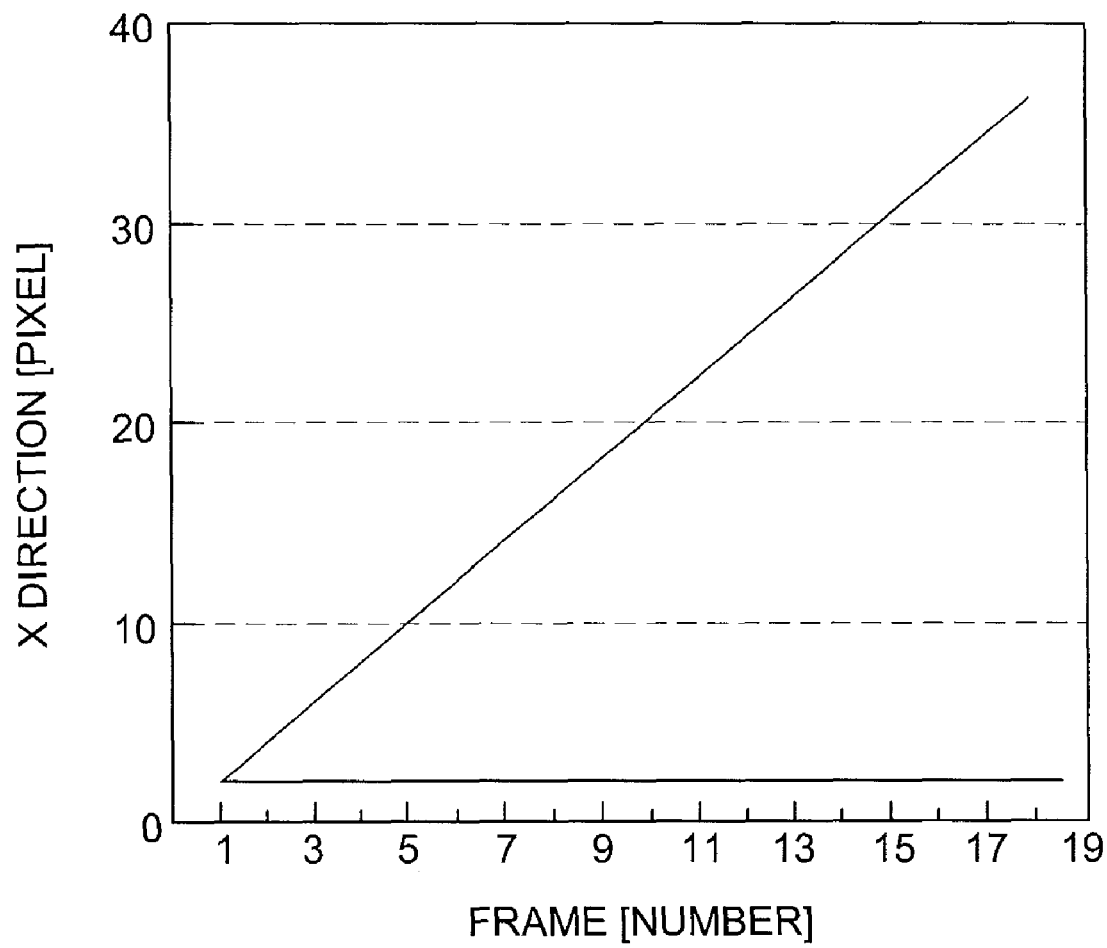
FIGS. 7A through 7C are graphs of motion mediating variables corresponding to a parallel motion in the direction of an x axis, a parallel motion in the direction of an y axis, and a rotation motion to the y axis, respectively.
Figure 7B:
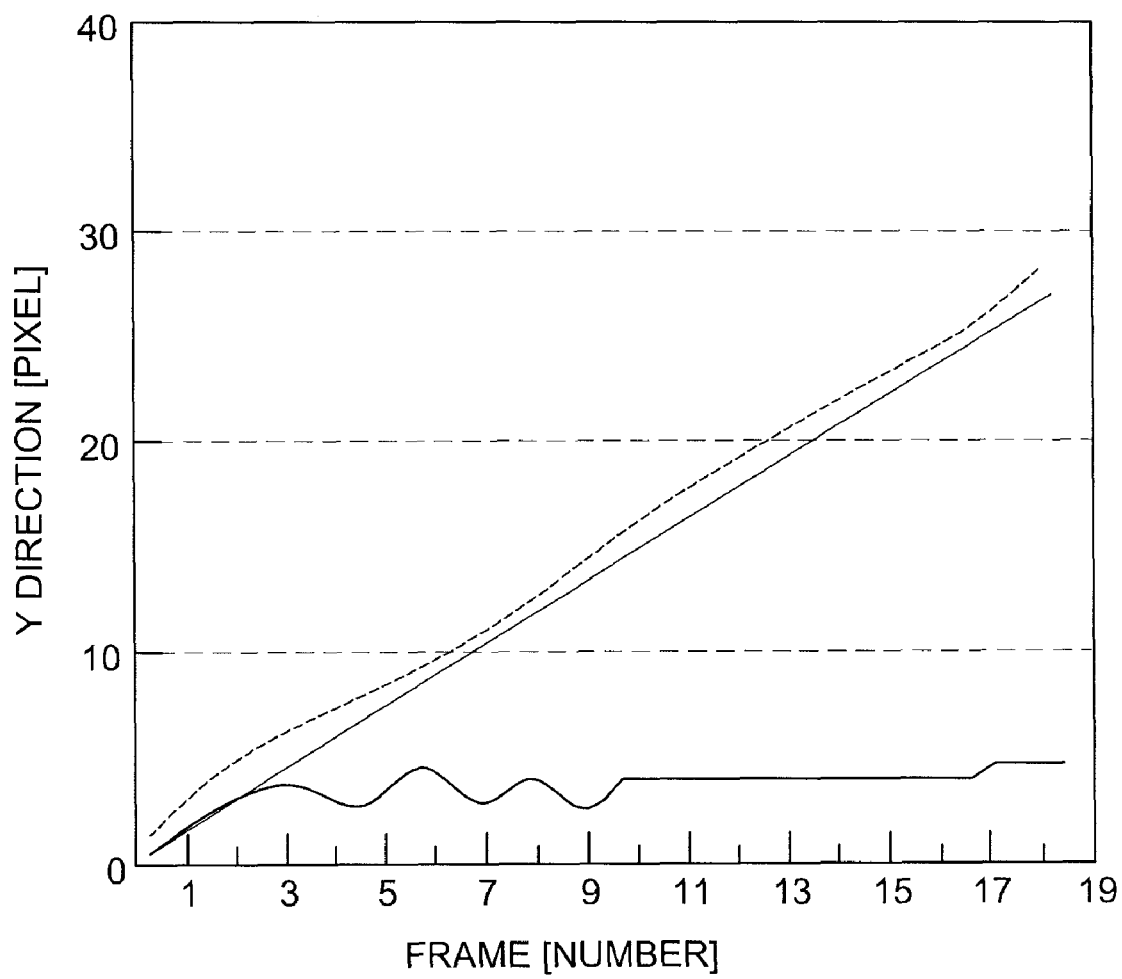
Figure 7C:
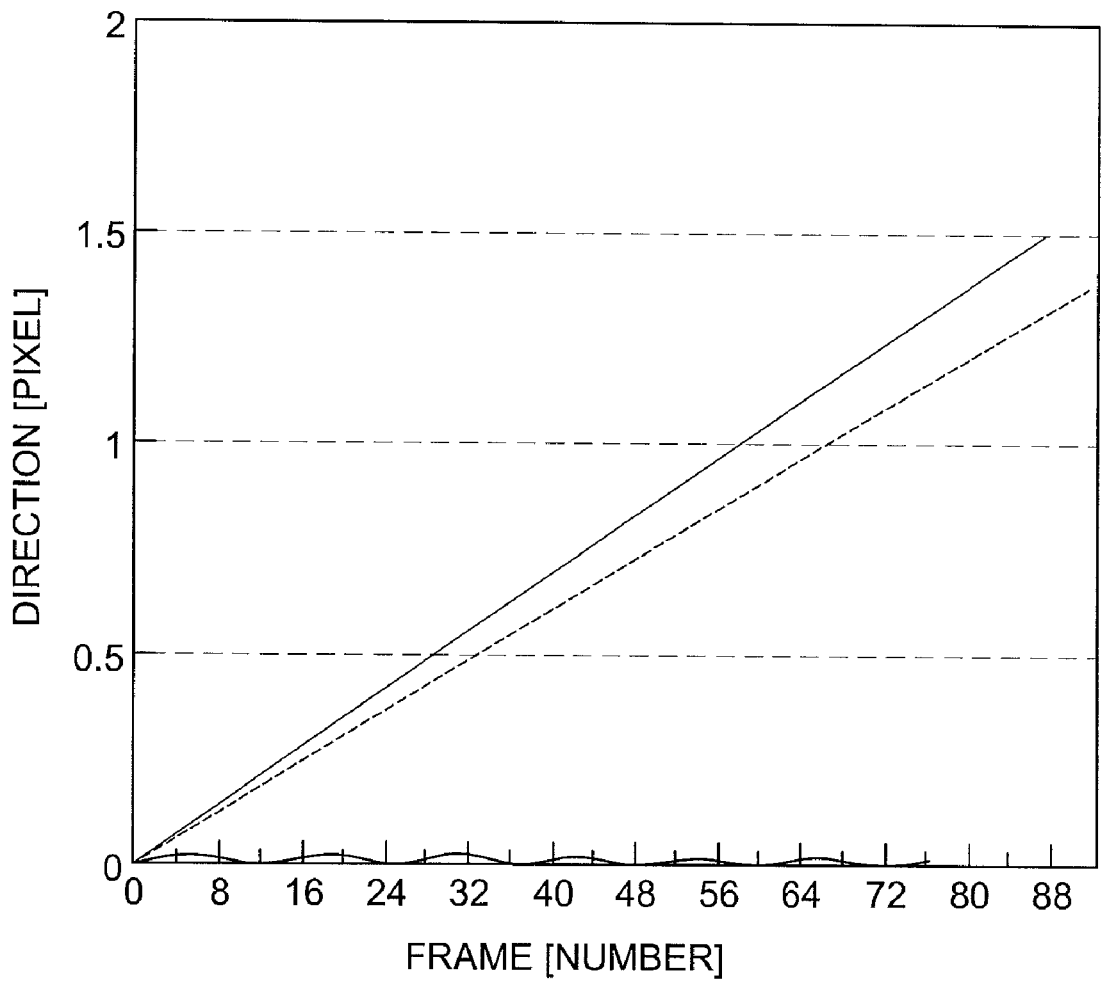

FIGS. 7A through 7C are graphs of motion mediating variables corresponding to a parallel motion in the direction of an x axis, a parallel motion in the direction of an y axis, and a rotation motion to the y axis. The graphs of motion mediating variables accumulated may be obtained by adding up motion mediating variables of respective image frames. When compared with graphs obtained assuming that no errors occur, the graph of the parallel motion in the direction of the x axis is exactly the same as the corresponding reference graph, and the graphs of the parallel motion in the direction of and rotation motion to the y axis are deviated from the corresponding reference graphs and errors occur. However, even in the latter case, such errors do not affect accuracy for panorama image generation.

When respective image frames are aligned with respect to the reference image frame according to computed motion mediating variables, an overlapping region composed of pixels overlapping the reference image frame is determined. For an image captured by a camera having a general photographing speed, the difference between chronologically neighboring image frames is indefinitely small. Thus, if all the image frames are aligned, efficiency of panorama image generation is low. Accordingly, a threshold value that does not cause errors in generating a panorama image is set, and an image frame that has an overlapping region having a size the most close to the threshold value is selected and used to generate a panorama image. The threshold value may be set such that the ratio of the overlapping region to the image frame is 40%. After an image frame that has an overlapping region with respect to the reference image frame, wherein a size of the overlapping region is most close to the threshold value, is selected from all the image frames, motion mediating variables are sequentially accumulated from the selected image frame and an image frame having an overlapping region having a size the most closer to the threshold value is selected. These accumulation and selection processes are repeatedly performed.

The frame combination unit 150 sequentially matches overlapping regions of respective image frames selected by the frame selection unit 140 to the reference image frame to generate a panorama image.

Image frames captured by a camera have different brightness due to an automatic gain controller (AGC) included in the camera. Accordingly, by equalizing average brightness values of image frames selected to form a panorama, the brightness of the panorama image can be maintained constant. In addition, due to the assumption that an image frame is present in a two-dimensional plane, corners of the image frame can be distorted. To reduce errors caused by the distortion, coordinates of respective pixels that constitute the image frame can be converted into cylindrical coordinates. In this case, a radius of the image frame that is converted into a cylindrical coordinate is a focus distance of the camera.

When pixels belonging to boundary portions of image frames that constitute a panorama image are not accurately matched, the panorama image has an unnatural boundary. Accordingly, an error cost of each pixel belonging to an overlapping region is computed by using the following equation, and a pixel that has the smallest error cost is selected in each column of the overlapping region to determine a junction region. Then, average pixel values of pixels that constitute the junction region and corresponding pixels belonging to the overlapping region of a previously selected image frame are inserted to positions of respective pixels that constitute the determined junction region.

$$\text{Totalcost}(x,y)=\text{Cost}(x,y)+\text{MIN}(\text{Totalcost}(x-1,y-1),\text{Totalcost}(x,y-1),\text{Totalcost}(x+1,y-1)) \qquad \text{[Equation 3]}$$

where Totalcost (x,y) is an error cost of a pixel having a coordinate (x,y) in the overlapping region, Cost (x,y) is a pixel value difference between a pixel (x,y) in the overlapping region and the corresponding pixel in the previously selected image frame, and the MIN is a minimum value.

Figure 8A:
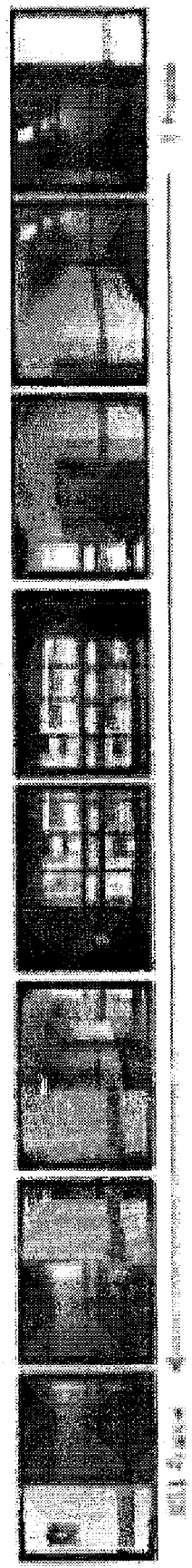
FIGS. 8A through 8C show image frames selected by a frame selection unit, a panorama image generated by a frame combination unit, and a panorama image having boundaries softened by the frame combination unit, respectively.
Figure 8B:
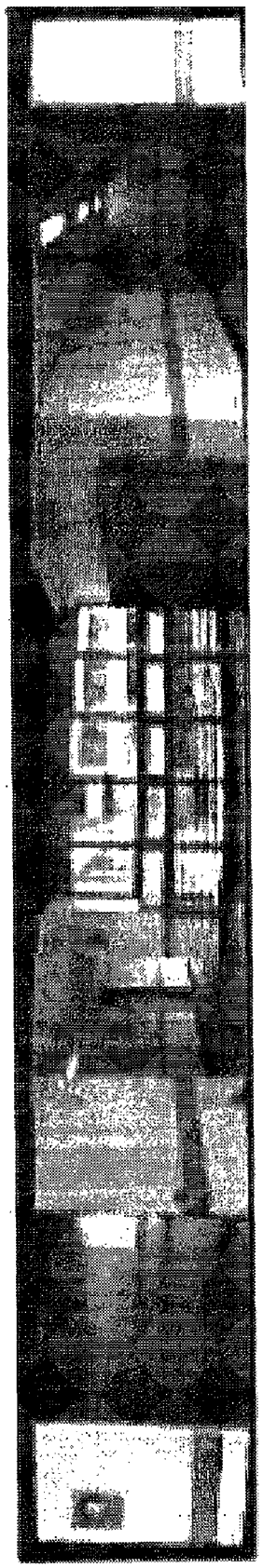
Figure 8C:
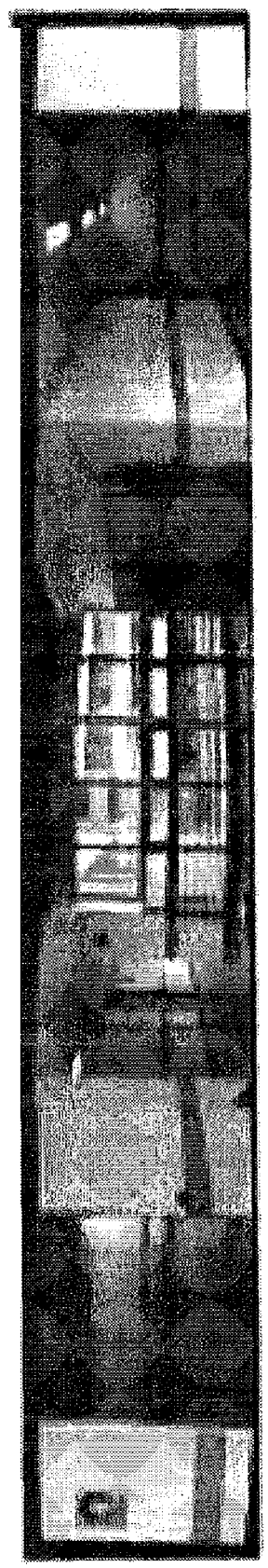

FIGS. 8A through 8C show image frames selected by the frame selection unit 140, a panorama image generated by the frame combination unit 150, and a panorama image having boundaries softened by the frame combination unit 150, respectively. When overlapping regions of respective image frames are simply matched to generate a panorama image, unnatural boundary portions are formed between the aligned image frames. However, when an average pixel value is used to soften boundaries, unnatural boundary portions are not formed.

Figure 9:
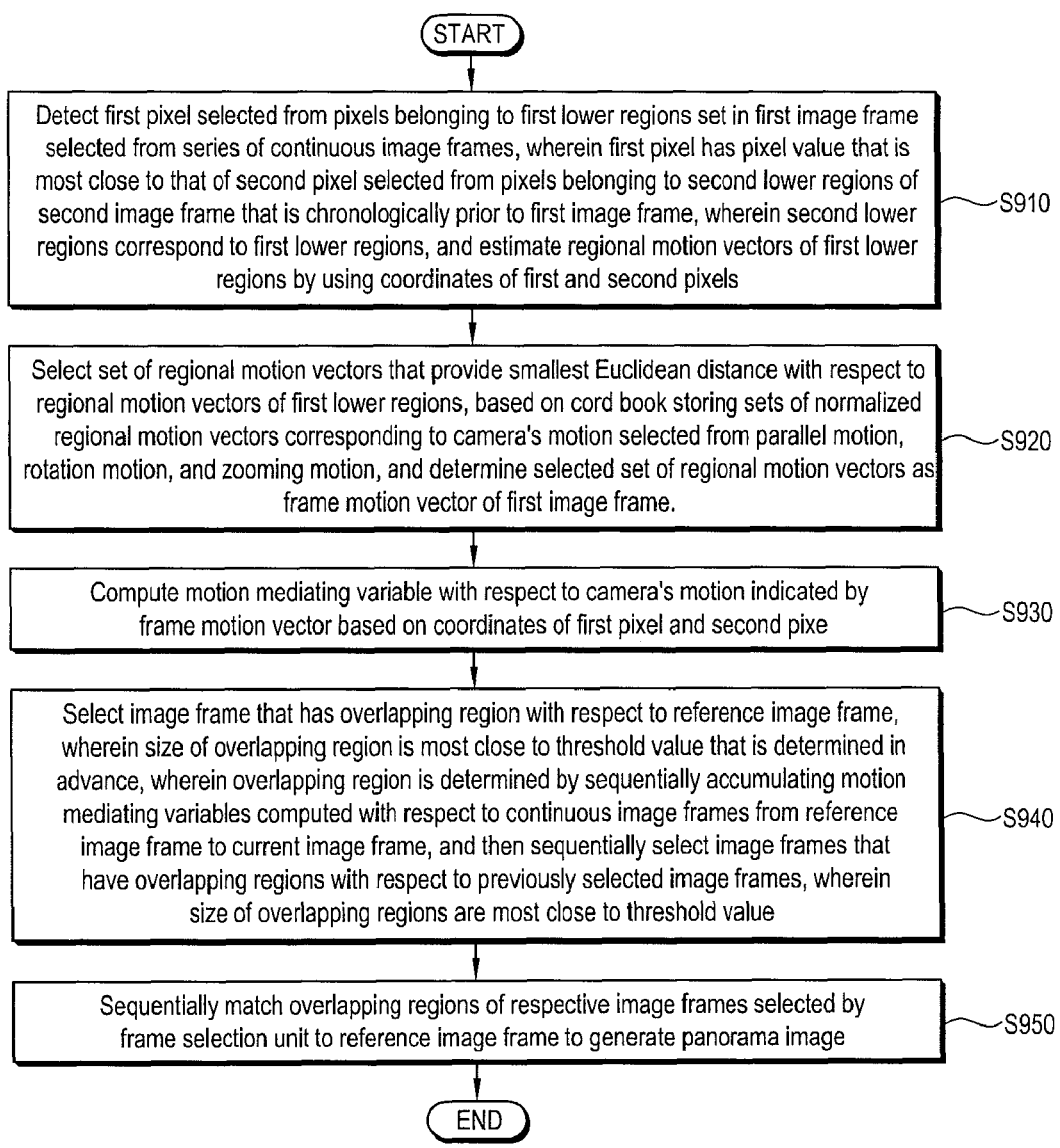
FIG. 9 is a flowchart illustrating a method of generating a panorama image according to an embodiment of the present invention.

FIG. 9 is a flowchart illustrating a method of generating a panorama image according to an embodiment of the present invention.

Referring to FIGS. 1 and 9, the regional motion vector estimation unit 110 detects a first pixel selected from pixels belonging to first lower regions set in a first image frame selected from a series of continuous image frames, wherein the first pixel has a pixel value that is most close to that of a second pixel selected from pixels belonging to second lower regions of a second image frame that is chronologically prior to the first image frame, wherein the second lower regions correspond to the first lower regions, and estimates regional motion vectors of the first lower regions by using coordinates of the first and second pixels (S910). Then, the frame motion vector determination unit 120 selects a set of regional motion vectors that provide the smallest Euclidean distance with respect to the regional motion vectors of the first lower regions, based on a codebook storing sets of normalized regional motion vectors corresponding to a camera's motion selected from a parallel motion, a rotation motion, and a zooming motion, and determines the selected set of regional motion vectors as a frame motion vector of the first image frame (S920). Then, the motion mediating variable computing unit 130 computes a motion mediating variable with respect to the camera's motion indicated by the frame motion vector based on coordinates of the first pixel and second pixel (S930). Then, the frame selection unit 140 selects an image frame that has an overlapping region with respect to a reference image frame, wherein the size of the overlapping region is most close to a threshold value that is determined in advance, wherein the overlapping region is determined by sequentially accumulating motion mediating variables computed with respect to continuous image frames from the reference image frame to the current image frame, and then sequentially selects image frames that have overlapping regions with respect to the previously selected image frames, wherein the size of the overlapping regions are most close to the threshold value (S940). Finally, the frame combination unit 150 sequentially matches overlapping regions of image frames selected by the frame selection unit 140 to the reference image frame to generate a panorama image (S950).

Figure 10:
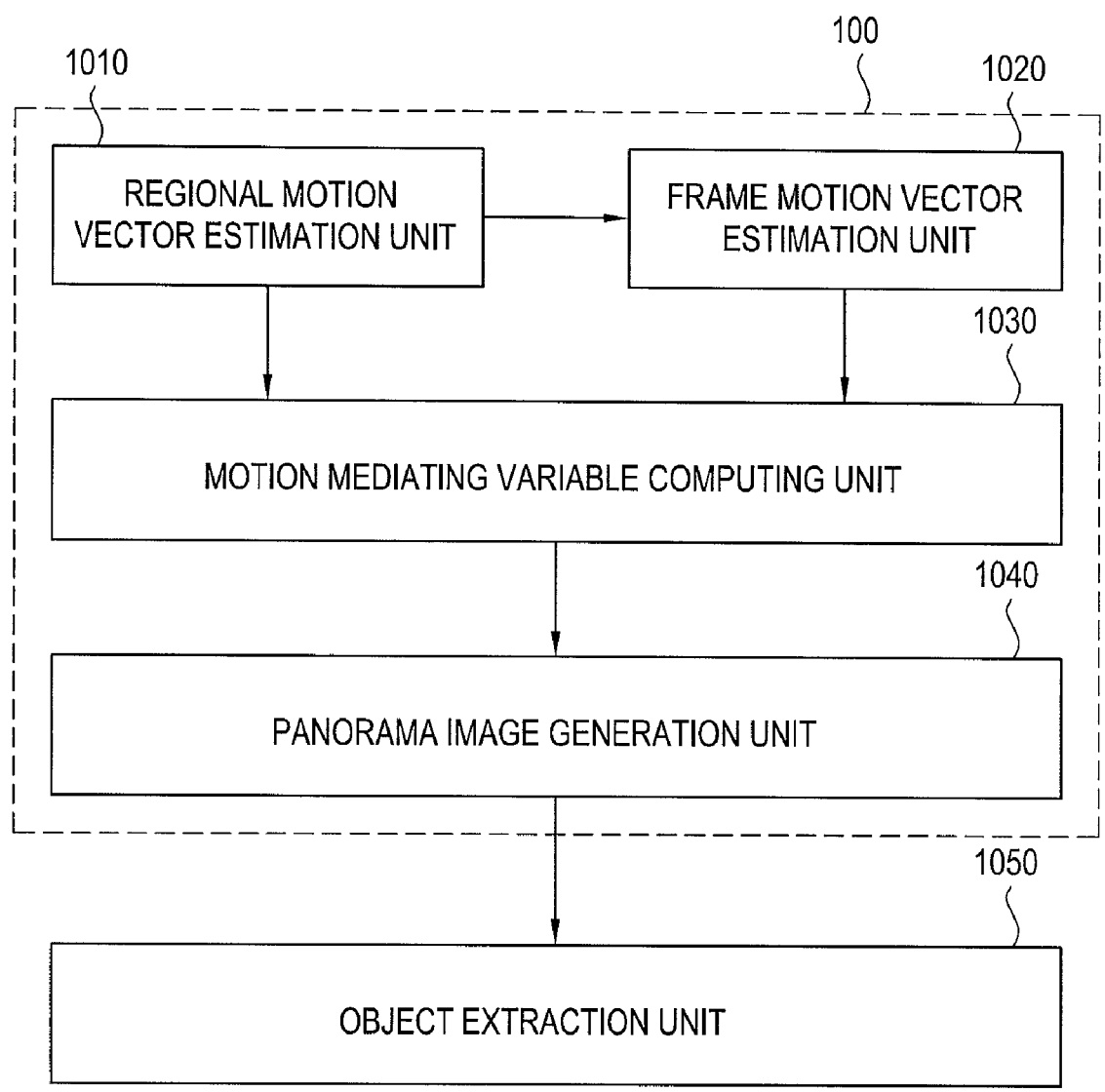
FIG. 10 is a block diagram illustrating an apparatus for tracking an object according to an embodiment of the present invention.

FIG. 10 is a block diagram illustrating an apparatus for tracking an object according to an embodiment of the present invention.

Referring to FIG. 10, the apparatus for tracking the object according to the current embodiment includes a regional motion vector estimation unit 1010, a frame motion vector estimation unit 1020, a motion mediating variable computing unit 1030, a panorama image generation unit 1040, and an object extraction unit 1050.

The regional motion vector estimation unit 1010 detects a first pixel selected from pixels belonging to first lower regions set in a first image frame selected from a series of continuous image frames, wherein the first pixel has a pixel value that is most close to that of a second pixel selected from pixels belonging to second lower regions of a second image frame that is chronologically prior to the first image frame, wherein the second lower regions correspond to the first lower regions, and estimates regional motion vectors of the first lower regions by using coordinates of the first and second pixels.

Since four corner portions of an image frame include motion information of the image frame, the first lower regions may be respectively disposed away from four corners of the first image frame by a predetermined distance.

The frame motion vector determination unit 1020 selects a set of regional motion vectors that provide the smallest Euclidean distance with respect to the regional motion vectors of the first lower regions, based on a codebook storing sets of normalized regional motion vectors corresponding to a camera's motion selected from a parallel motion, a rotation motion, and a zooming motion, and determines the selected set of regional motion vectors as a frame motion vector of the first image frame.

The Euclidean distance between the regional motion vectors of the first lower regions and regional motion vectors stored in the codebook is computed by using Equation 1, the frame motion vectors of the first image frame determined by the frame motion vector determination unit 120 indicate motion type of the first image frame with respect to the second image frame.

The motion mediating variable computing unit 1030 computes a motion mediating variable with respect to the camera's motion indicated by the frame motion vector based on coordinates of the first pixel and second pixel.

The motion of the first image frame with respect to the second image frame is represented by Equation 2, and only one motion mediating variable is computed among motion mediating variables corresponding to a parallel motion, a rotation motion, and a zooming motion which are represented by Equation 2.

The regional motion vector estimation unit 1010, frame motion vector determination unit 1020 and motion mediating variable computing unit 1030 of the apparatus for tracking the object according to the current embodiment may be respectively embodied by the regional motion vector estimation unit 110, frame motion vector determination unit 120 and motion mediating variable computing unit 130 of the panorama image generation apparatus 100.

The panorama image generation unit 1040: selects an image frame that has an overlapping region with respect to a reference image frame, wherein the size of the overlapping region is most close to a threshold value that is determined in advance, wherein the overlapping region is determined by sequentially accumulating motion mediating variables computed with respect to continuous image frames from the reference image frame to the current image frame; sequentially selects image frames that have overlapping regions with respect to the previously selected image frames, wherein the size of the overlapping regions are most close to the threshold value; and then, matches overlapping regions of respective image frames selected to generate a panorama image.

The panorama image generation unit 1040 of the apparatus for tracking the object according to the current embodiment may also be embodied by the frame selection unit 140 and frame combination unit 150 of the panorama image generation apparatus 100.

The object extraction unit 1050 sets the panorama image as a background image, computes pixel value difference values between pixels that constitutes a captured input image and corresponding pixels that constitutes the background image, and determines an object region that includes pixels having pixel value difference values greater than a reference value that is set in advance.

Although a moving object can be most easily extracted by using an image difference method, a background image that does not contain the object needs to be accurately formed to extract the object. Accordingly, when a background from which the object is to be extracted is photographed with a camera and a panorama image is accurately formed by the panorama image generation apparatus 100, the panorama image is set as a background image.

Figure 11A:
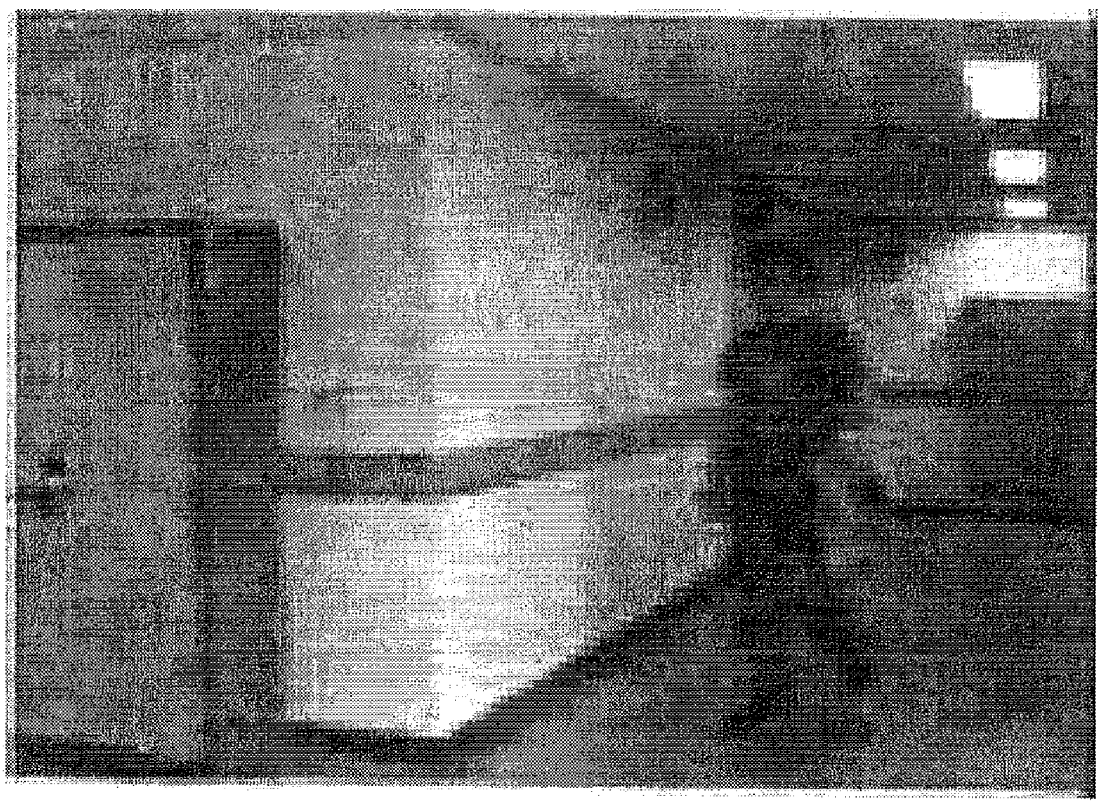
FIGS. 11A and 11B show an input image captured by a camera to track an object and a panorama image generated by a panorama image generation apparatus, respectively.
Figure 11B:
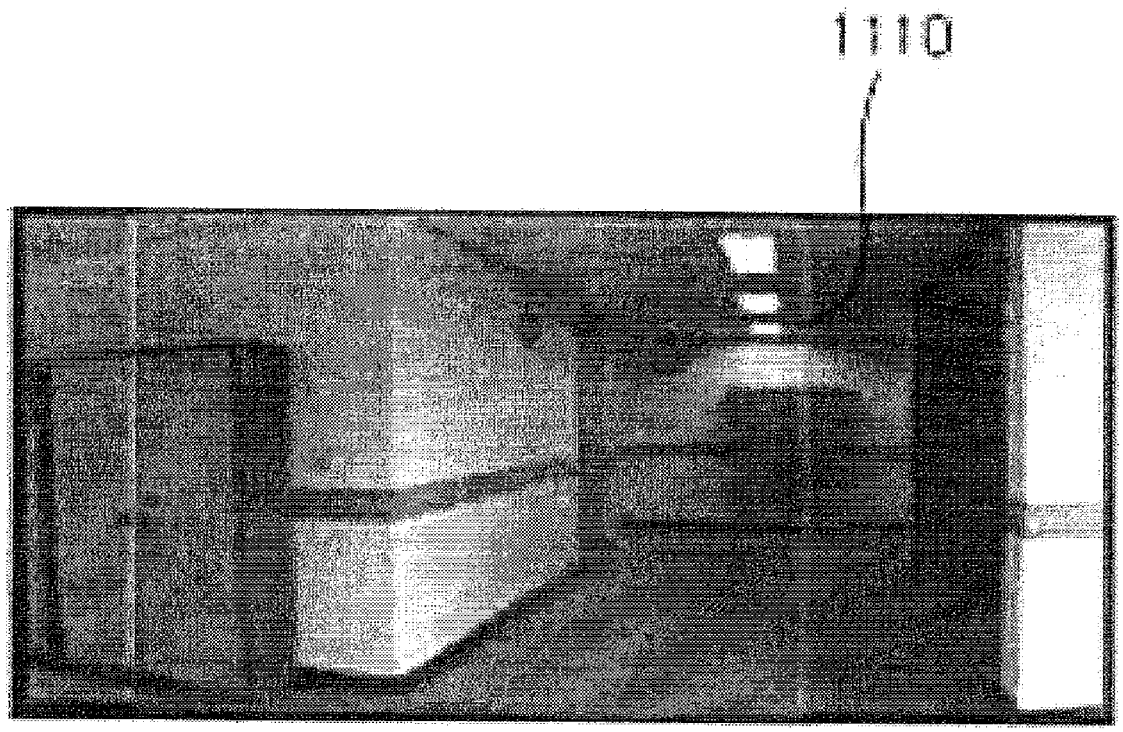

FIGS. 11A and 11B show an input image captured by a camera to track an object and a panorama image generated by the panorama image generation apparatus 110, respectively. When pixel value difference values between pixels that constitute the input image and corresponding pixels that constitute the panorama image are computed, an object region having pixels that do not match is obtained. To accurately detect pixels of the panorama image corresponding to pixels of the input image, the motion amount and motion direction of the camera with respect to a reference point during capturing the input image can be used to set a photographed region 1110 corresponding to the input image in the panorama image.

In addition, an error occurs in the difference value between the input image and the panorama image due to an error occurring when the panorama image is generated and thus, the object region is not accurately determined. Accordingly, the object region can be determined by averaging pixel value difference values between pixels that constitute the input image and corresponding pixels that constitute the background image and pixel value difference values between pixels that constitute the input image and corresponding pixels that constitute a neighboring image that is chronologically connected to the input image.

Figure 12A:
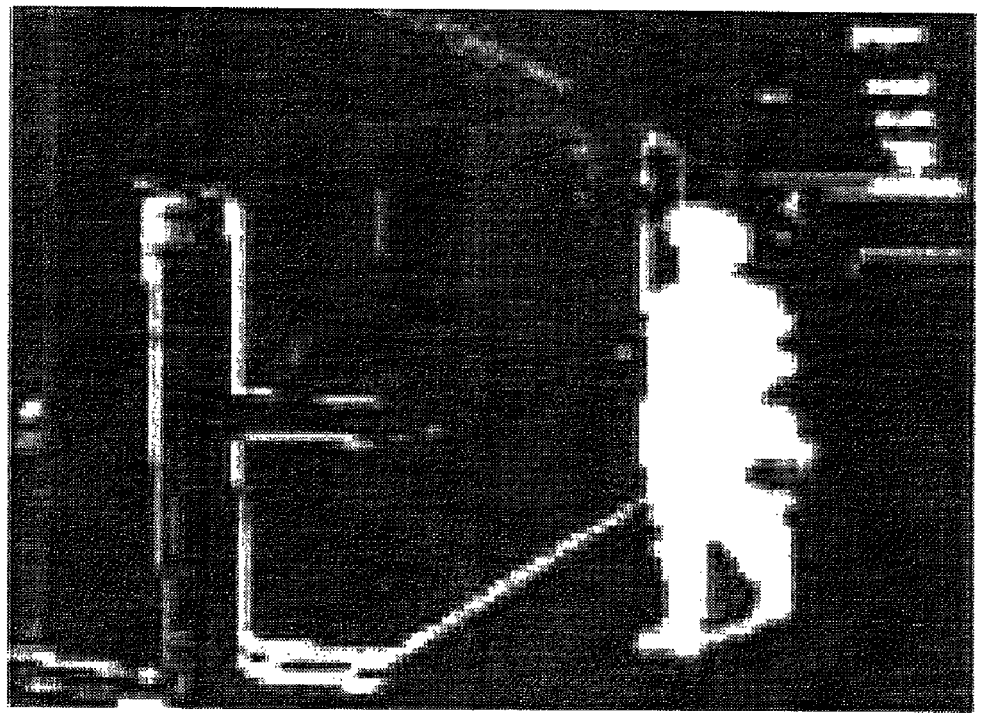
FIGS. 12A through 12C show a difference image between an input image and a panorama image, a difference image between the input image and a neighboring image, and an image generated by averaging a difference value between the input image and the panorama image and a difference value between the input image and the neighboring image.
Figure 12B:
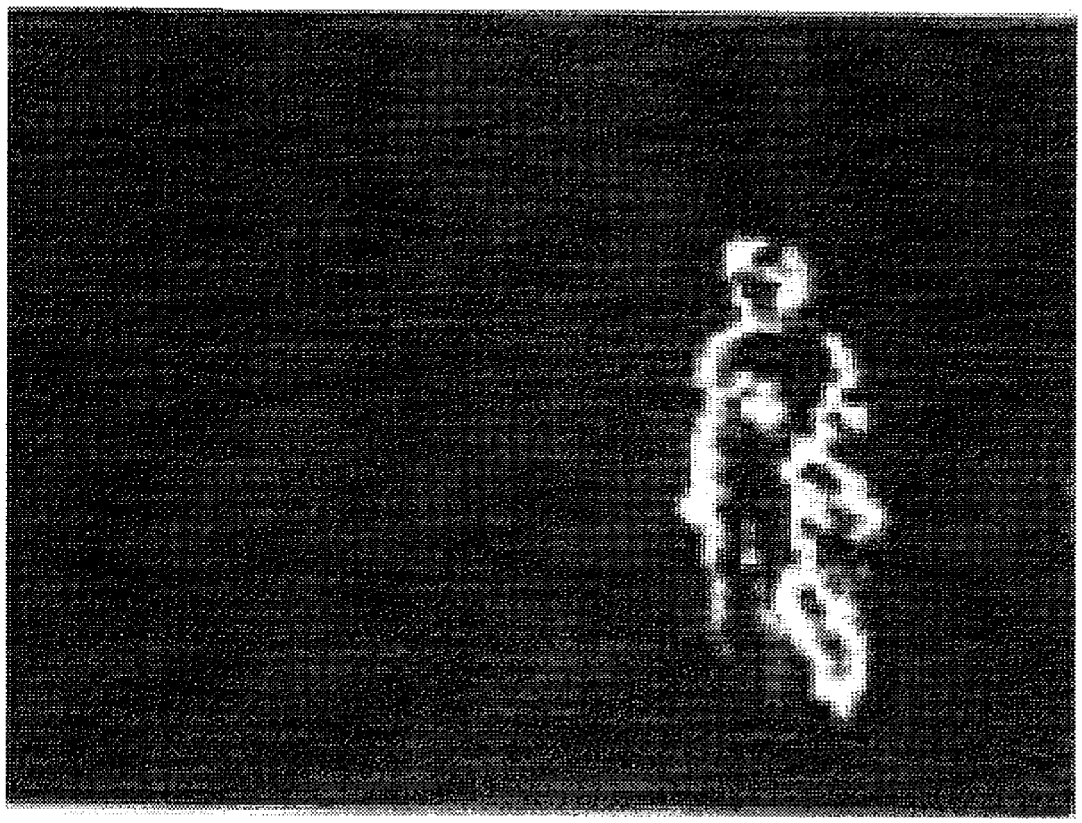
Figure 12C:
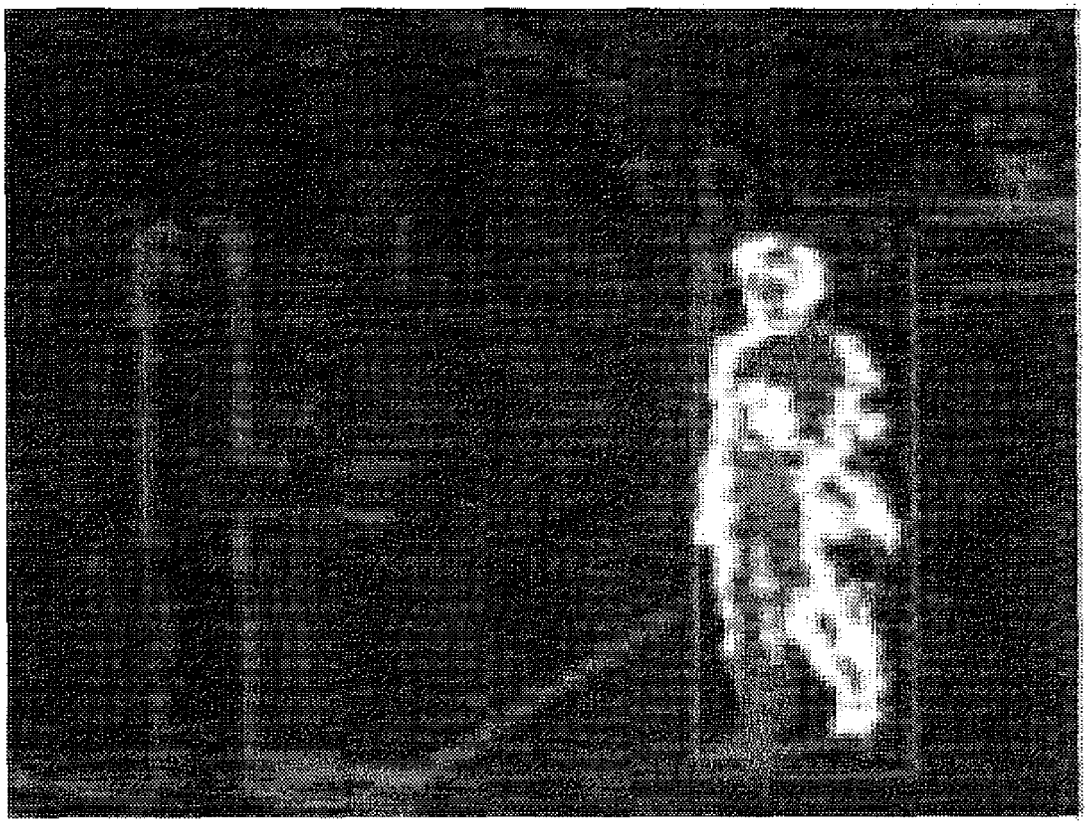

FIGS. 12A through 12C show a difference image between the input image and the panorama image, a difference image between the input image and the neighboring image, and an image generated by averaging a difference value between the input image and the panorama image and a difference value between the input image and the neighboring image. When the object region is determined by using the difference image between the input image and the panorama image, it is difficult to accurately determine the object region because other parts of the image may also have a high difference value. However, when the difference value between the input image and the neighboring image is computed and those two difference values are averaged, the difference value may be reduced in other portions excluding a portion in which the object is present. Therefore, only the portion in which the object is present can be determined as the object region.

FIG. 13 is a flowchart illustrating a method of tracking an object according to an embodiment of the present invention.

Referring to FIGS. 10 and 13, the regional motion vector estimation unit 1010 detects a first pixel selected from pixels belonging to first lower regions set in a first image frame selected from a series of continuous image frames, wherein the first pixel has a pixel value that is most close to that of a second pixel selected from pixels belonging to second lower regions of a second image frame that is chronologically prior to the first image frame, wherein the second lower regions correspond to the first lower regions, and estimates regional motion vectors of the first lower regions by using coordinates of the first and second pixels (S1310). Then, the frame motion vector determination unit 1020 selects a set of regional motion vectors that provide the smallest Euclidean distance with respect to the regional motion vectors of the first lower regions, based on a codebook storing sets of normalized regional motion vectors corresponding to a camera's motion selected from a parallel motion, a rotation motion, and a zooming motion, and determines the selected set of regional motion vectors as a frame motion vector of the first image frame (S1320). Then, the motion mediating variable computing unit 1030 computes a motion mediating variable with respect to the camera's motion indicated by the frame motion vector based on the coordinates of the first pixel and second pixel (S1330). Then, the panorama image generation unit 1040: selects an image frame that has an overlapping region with respect to a reference image frame, wherein the size of the overlapping region is most close to a threshold value that is determined in advance, wherein the overlapping region is determined by sequentially accumulating motion mediating variables computed with respect to continuous image frames from the reference image frame to the current image frame; sequentially selects image frames that have overlapping regions with respect to the previously selected image frames, wherein the size of the overlapping regions are most close to the threshold value; and then, matches overlapping regions of respective image frames selected to generate a panorama image (S1340). Finally, the object extraction unit 1050 sets the panorama image as a background image, computes pixel value difference values between pixels that constitutes a captured input image and corresponding pixels that constitutes the background image, and determines an object region that includes pixels having pixel value difference values greater than a reference value that is set in advance (S1350).

For an apparatus and method for generating a panorama image according to an embodiment of the present invention, a coordinate of a pixel selected in lower regions set in a series of continuous image frames is used to estimate a regional motion vector, in order to simplify a computing process and increase a process speed. In addition, since a frame motion vector is selected from a codebook that stores normalized regional motion vectors corresponding to camera motions, effects of a wrongly estimated regional motion vector on the panorama image generation can be minimized. Furthermore, for an apparatus and method for tracking an object according to an embodiment of the present invention, since a panorama image that is set as a background image can be accurately generated, and a difference between a captured input image and a background image and a difference between the captured input image and a neighboring image are averaged, generation of noises can be minimized and an object can be accurately extracted.

In addition, other embodiments can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet. Thus, the medium may be such a defined and measurable structure including or carrying a signal or information, such as a device carrying a bitstream according to one or more embodiments. The media may also be a distributed network, so that the computer readable code is stored/transferred and executed in a distributed fashion. Furthermore, the processing element could include a processor or a computer processor, and processing elements may be distributed and/or included in a single device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for generating a panorama image, the apparatus comprising:
a regional motion vector estimation unit that detects a first pixel selected from pixels belonging to first lower regions set in a first image frame selected from a series of continuous image frames, wherein the first pixel has a pixel value that is most close to that of a second pixel selected from pixels belonging to second lower regions of a second image frame that is chronologically prior to the first image frame, wherein the second lower regions correspond to the first lower regions, and estimates regional motion vectors of the first lower regions by using coordinates of the first and second pixels;
a frame motion vector determination unit that selects a set of regional motion vectors that provide the smallest Euclidean distance with respect to the regional motion vectors of the first lower regions, based on a code book storing sets of normalized regional motion vectors corresponding to a camera's motion selected from a parallel motion, a rotation motion, and a zooming motion, and determines the selected set of regional motion vectors as a frame motion vector of the first image frame;

a motion mediating variable computing unit that computes a motion mediating variable with respect to the camera's motion indicated by the frame motion vector based on the coordinates of the first pixel and second pixel;

a frame selection unit that selects an image frame having an overlapping region with respect to a reference image frame, wherein the size of the overlapping region is most close to a threshold value that is determined in advance, wherein the overlapping region is determined by sequentially accumulating motion mediating variables computed with respect to continuous image frames from the reference image frame to the current image frame, and then sequentially selects image frames that have overlapping regions with respect to the previously selected image frames, wherein the size of the overlapping regions are most close to the threshold value; and a frame combination unit that sequentially matches overlapping regions of image frames selected by the frame selection unit to the reference image frame to generate a panorama image.

2. The apparatus of claim 1, wherein the first lower regions are respectively disposed away from four corners of the first image frame by a predetermined distance.

3. The apparatus of claim 1, wherein the frame combination unit converts coordinates of pixels that constitute respective image frames into cylindrical coordinates.

4. The apparatus of claim 1, wherein the frame combination unit inserts an average pixel value of pixels that constitutes a junction region and corresponding pixels in an overlapping region of the previously selected image frame into positions of respective pixels of the junction region, wherein the junction region is determined by selecting the smallest error cost in each column of the overlapping region, wherein the error cost is computed based on a pixel value of each pixel that constitutes the overlapping region.

5. A method of generating a panorama image, the method comprising:

estimating regional motion vectors by detecting a first pixel selected from pixels belonging to first lower regions set in a first image frame selected from a series of continuous image frames, wherein the first pixel has a pixel value that is most close to that of a second pixel selected from pixels belonging to second lower regions of a second image frame that is chronologically prior to the first image frame, wherein the second lower regions correspond to the first lower regions, and estimating regional motion vectors of the first lower regions by using coordinates of the first and second pixels;

determining a frame motion vector by selecting a set of regional motion vectors that provide the smallest Euclidean distance with respect to the regional motion vectors of the first lower regions, based on a code book storing sets of normalized regional motion vectors corresponding to a camera's motion selected from a parallel motion, a rotation motion, and a zooming motion, and determining the selected set of regional motion vectors as a frame motion vector of the first image frame;

computing a motion mediating variable with respect to the camera's motion indicated by the frame motion vector based on coordinates of the first pixel and second pixel;

selecting frames by selecting an image frame having an overlapping region with respect to a reference image frame, wherein the size of the overlapping region is most close to a threshold value that is determined in advance, wherein the overlapping region is determined by sequentially accumulating motion mediating variables computed with respect to continuous image frames from the reference image frame to the current image frame, and then sequentially selecting image frames having overlapping regions with respect to the previously selected image frames, wherein the size of the overlapping regions are most close to the threshold value; and combining frames by sequentially matching overlapping regions of image frames selected by the frame selection unit to the reference image frame to generate a panorama image.

6. The method of claim 5, wherein the first lower regions are respectively disposed away from four corners of the first image frame by a predetermined distance.

7. The method of claim 5, wherein, when the combining frames comprises converting coordinates of pixels that constitute respective image frames into cylindrical coordinates.

8. The method of claim 5, wherein, when the combining frames comprises inserting an average pixel value of pixels that constitutes a junction region and corresponding pixels in an overlapping region of the previously selected image frame into positions of pixels of the junction region, wherein the junction region is determined by selecting the smallest error cost in each column of the overlapping region, wherein the error cost is computed based on a pixel value of each pixel that constitutes the overlapping region.

9. A non-transitory computer readable recording medium in which a program for executing the method of claim 5 in a computer is recorded.

* * * * *